US011871415B2

(12) United States Patent
Xu et al.

(10) Patent No.: US 11,871,415 B2
(45) Date of Patent: Jan. 9, 2024

(54) BEAM INDICATION FOR WIRELESS DEVICES

(71) Applicant: Comcast Cable Communications, LLC, Philadelphia, PA (US)

(72) Inventors: Kai Xu, Herndon, VA (US); Esmael Dinan, McLean, VA (US); Hua Zhou, Herndon, VA (US); Yunjung Yi, Vienna, VA (US); Ali Cirik, Herndon, VA (US); Jonghyun Park, Vienna, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 165 days.

(21) Appl. No.: 17/364,446

(22) Filed: Jun. 30, 2021

(65) Prior Publication Data
US 2021/0410132 A1 Dec. 30, 2021

Related U.S. Application Data

(60) Provisional application No. 63/046,355, filed on Jun. 30, 2020.

(51) Int. Cl.
*H04W 72/04* (2023.01)
*H04W 72/20* (2023.01)
*H04W 72/044* (2023.01)

(52) U.S. Cl.
CPC ......... *H04W 72/20* (2023.01); *H04W 72/046* (2013.01)

(58) Field of Classification Search
CPC ..... H04W 72/20; H04W 72/046; H04W 8/20; H04W 36/0072; H04W 16/28; H04B 7/0695; H04B 7/088; H04B 7/06; H04B 7/08
See application file for complete search history.

(56) References Cited

U.S. PATENT DOCUMENTS

| | | | |
|---|---|---|---|
| 10,700,837 B2 | 6/2020 | Abdoli et al. | |
| 10,931,355 B2 | 2/2021 | Huang | |
| 2020/0044797 A1* | 2/2020 | Guo | H04L 5/0094 |
| 2020/0107336 A1 | 4/2020 | Yang et al. | |
| 2020/0178240 A1 | 6/2020 | Zhang et al. | |
| 2020/0314664 A1* | 10/2020 | Zhou | H04L 5/0023 |
| 2020/0350972 A1* | 11/2020 | Yi | H04L 1/12 |
| 2020/0351682 A1* | 11/2020 | Cirik | H04L 5/0091 |

FOREIGN PATENT DOCUMENTS

| | | | | |
|---|---|---|---|---|
| WO | 2019195528 A1 | 10/2019 | | |
| WO | WO-2019195528 A1 * | 10/2019 | ............. | H04B 7/088 |

OTHER PUBLICATIONS

R1-1718461—Xiaomi, "Disscussion on the remaining issues of group common PDCCH" 3GPP TSG RAN WG1 Meeting 90bis; Prague, CZ, Oct. 9-13, 2017.

(Continued)

*Primary Examiner* — Mewale A Ambaye
(74) *Attorney, Agent, or Firm* — Banner & Witcoff, Ltd.

(57) ABSTRACT

Wireless devices may communicate via a plurality of transmission and/or reception beams. Control information may be used to indicate one or more beams to be used by wireless devices. A configuration message may indicate a portion of the control information corresponding to a particular wireless device of the wireless devices.

20 Claims, 26 Drawing Sheets

(56) References Cited

OTHER PUBLICATIONS

Nov. 1, 20215—European Search Report—EP 21182794.4.
R1-2004633 3GPP TSG RAN WG1 Meeting #101-e, May 25-Jun. 5, 2020, Source: Ericsson, Title: High Level Views on Rel-17 feMIMO.
R1-2004269 3GPP TSG RAN WG1 Meeting #101-e, e-Meeting, May 25-Jun. 5, 2020, Source: Nokia, Nokia Shanghai Bell, Title: Discussion on Rel-17 NR FeMIMO.
R1-1911224 3GPP TSG-RAN WG1 Meeting #98bis, Chongqing, China, Oct. 14-20, 2019, Source: Ericsson, Title: Remaining issues on multi-beam enhancements.
R1-1911216 3GPP TSG RAN WG1 Meeting #98bis, Chongqing, China, Oct. 14-20, 2019, Source: Xiaomi, Title: Enhancements on beam management.
R1-1911185 3GPP TSG RAN WG1 Meeting #98bis, Chongqing, China, Oct. 14-20, 2019, Source: NTT DOCOMO, Inc., Title: Discussion on multi-beam enhancement.
R1-1911127 3GPP TSG-RAN WG1 Meeting #98, Chongqing, China, Oct. 14-20, 2019, Source: Qualcomm Incorporated, Title: Enhancements on Multi-beam Operation.
R1-1911047 3GPP TSG RAN WG1 Meeting #98, Chongqing, China, Oct. 14-20, 2019, Source: MediaTek Inc., Title: Enhancements on multi-beam operations.
R1-1911006 3GPP TSG-RAN WG1 Meeting #98bis, Chongqing, China, Oct. 14-20, 2019, Source: Convida Wireless, Title: On Beam Failure Recovery for Scell.
R1-1910969 3GPP TSG RAN WG1 Meeting #98bis, Chongqing, China, Oct. 14-20, 2019, Source: Apple Inc., Title: Remaining Issues on Multi-beam operation.
R1-1910919 3GPP TSG RAN WG1 Meeting #98bis, Chongqing, China, Oct. 14-20, 2019, Source: FUTUREWEI, Title: On multi-beam operation enhancements.
R1-1910916 3GPP TSG RAN WG1 Meeting #98bis, Chongqing, China, Oct. 14-20, 2019, Source: Nokia, Nokia Shanghai Bell, Title: Enhancements on Multi-beam Operation.
R1-1910857 3GPP TSG RAN WG1 Meeting #98bis, Chongqing, China, Oct. 14-20, 2019, Title: Discussion of Beam Failure Recovery for SCell.
R1-1910847 3GPP TSG-RAN WG1 Meeting #98bis, Chongqing, China, Oct. 14-20, 2019, Source: Asia Pacific Telecom, Title: Discussion on Multi-beam Operations.
R1-1910750 3GPP TSG RAN WG1 Meeting #98bis, Chongqing, China, Oct. 14-20, 2019, Source: Sony, Title: Enhancements on multi-beam operation.
R1-1910669 3GPP TSG RAN WG1 Meeting #98bis, Chongqing, China, Oct. 14-20, 2019, Source: Intel Corporation, Title: Discussion on multi-beam enhancements.
R1-1910583 3GPP TSG RAN WG1 Meeting #98bis, Chongqing, China, Oct. 14-20, 2019, Source: LG Electronics, Title: Discussion on multi-beam based operations and enhancements.
R1-1910568 3GPP TSG RAN WG1 Meeting #98bis, Chongqing, China, Oct. 13-20, 2019, Source: NEC, Title: Discussion on multi-beam operation.
R1-1910565 3GPP TSG RAN WG1 Meeting #98bis, Chongqing, China, Oct. 14-20, 2019, Source: Panasonic, Title: Enhancements on multi-beam operations.
R1-1910494 3GPP TSG RAN WG1 Meeting #98bis, Chongqing, China, Oct. 14-18, 2019, Source: Samsung, Title: Enhancements on multi-beam operations.
R1-1910432 3GPP TSG RAN WG1 Meeting #97, Chongqing, China, Aug. 14-20, 2019, Source: Fraunhofer IIS, Fraunhofer HHI, Title: Enhancements on UE multi-beam operation.
R1-1910350 3GPP TSG RAN WG1 Meeting #98bis, Chongqing, China, Oct. 13-20, 2019, Source: CATT, Title: Remaining issues on beam management enhancements in Rel. 16.
R1-1910285 3GPP TSG RAN WG1 Meeting #98bis, Chongqing, China, Oct. 14-20, 2019, Source: ZTE, Title: Enhancements on multi-beam operation.
R1-1910230 3GPP TSG RAN WG1 Meeting #98bis, Chongqing, China, Oct. 14-20, 2019, Source: vivo, Title: Discussion on remaining issues on multi beam enhancement.
R1-1910191 3GPP TSG RAN WG1 Meeting #98bis, Chongqing, China, Oct. 14-20, 2019, Source: Fujitsu, Title: Enhancements on Multi-beam Operation.
R1-1910171 3GPP TSG RAN WG1 Meeting #98bis, Chongqing, China, Oct. 14-20, 2019, Source: CMCC, Title: Enhancements on multi-beam operation.
R1-1910143 3GPP TSG RAN WG1 Meeting #98bis, Chongqing, China, Oct. 14-18, 2019, Source: Lenovo, Motorola Mobility, Title: Discussion of multi-beam operation.
R1-1910117 3GPP TSG RAN WG1 Meeting #98bis, Chongqing, China, Oct. 14-20, 2019, Source: OPPO, Title: Discussion on Multi-beam Operation Enhancements.
R1-1910074 3GPP TSG RAN WG1 Meeting #98bis, Chongqing, China, Oct. 14-20, 2019, Source: Huawei, HiSilicon, Title: Enhancements on multi-beam operation.
3GPP TS 38.331 V15.6.0 (Jun. 2019), Technical Specification, 3rd Generation Partnership Project; Technical Specification Group Radio Access Network; NR; Radio Resource Control (RRC) protocol specification (Release 15).
3GPP TS 38.321 V15.6.0 (Jun. 2019), Technical Specification, 3rd Generation Partnership Project; Technical Specification Group Radio Access Network; NR; Medium Access Control (MAC) protocol specification (Release 15).
3GPP TS 38.214 V15.6.0 (Jun. 2019), Technical Specification, 3rd Generation Partnership Project; Technical Specification Group Radio Access Network; NR; Physical layer procedures for data (Release 15).
3GPP TS 38.213 V15.6.0 (Jun. 2019), Technical Specification, 3rd Generation Partnership Project; Technical Specification Group Radio Access Network; NR; Physical layer procedures for control (Release 15).
3GPP TS 38.212 V15.6.0 (Jun. 2019), Technical Specification; 3rd Generation Partnership Project; Technical Specification Group Radio Access Network; NR; Multiplexing and channel coding (Release 15).
3GPP TS 38.211 V15.6.0 (Jun. 2019), Technical Specification, 3rd Generation Partnership Project; Technical Specification Group Radio Access Network; NR; Physical channels and modulation (Release 15).

\* cited by examiner

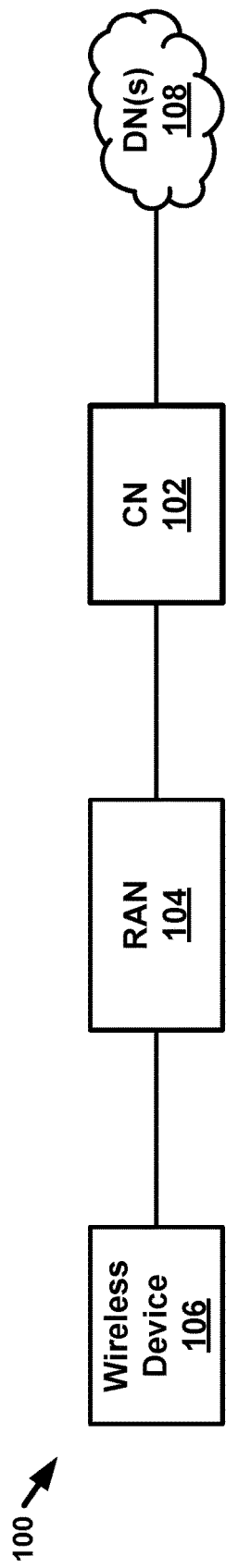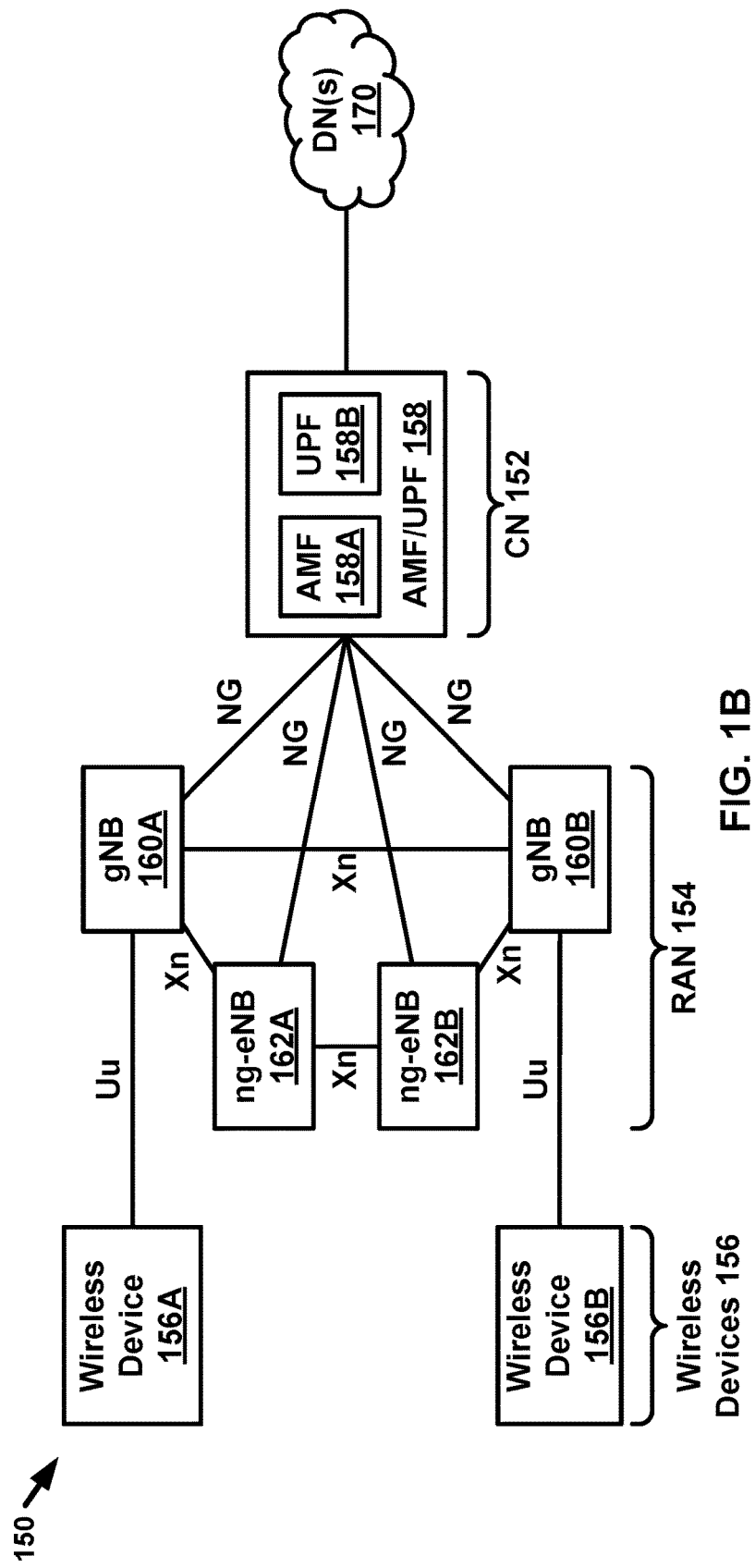

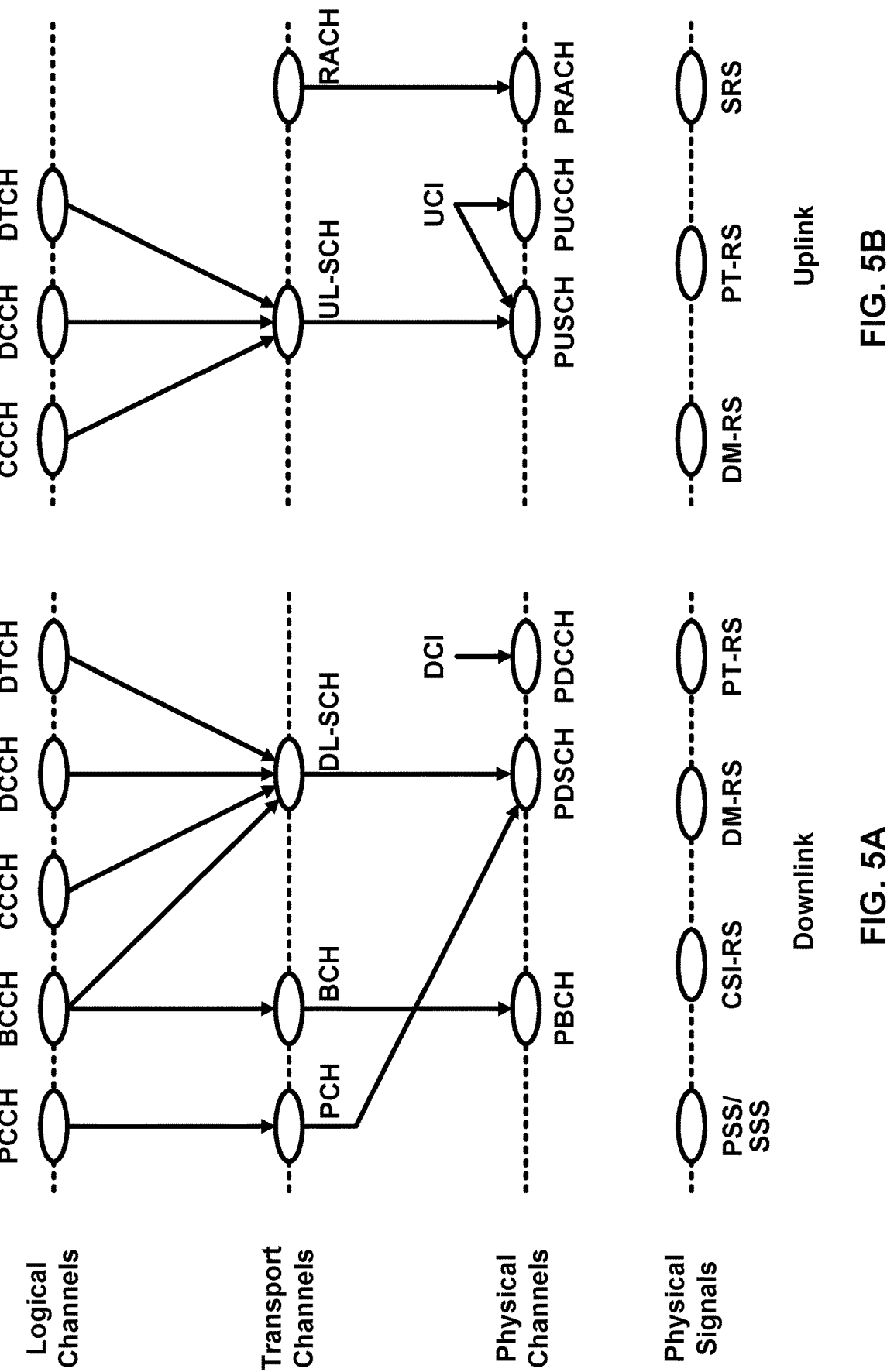

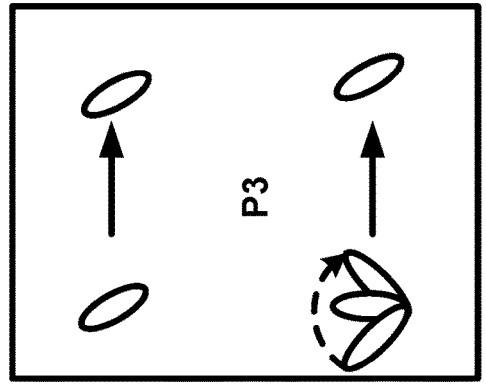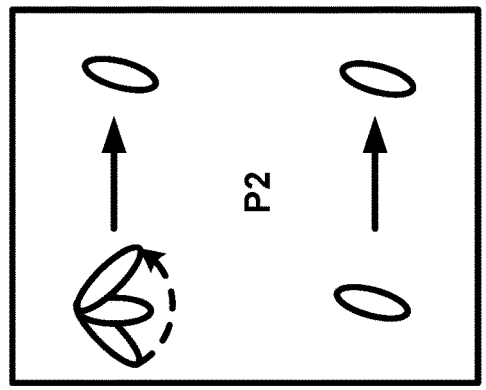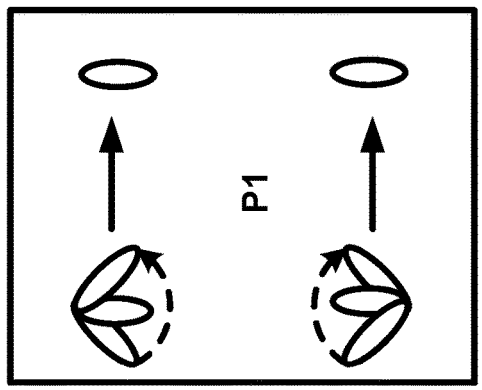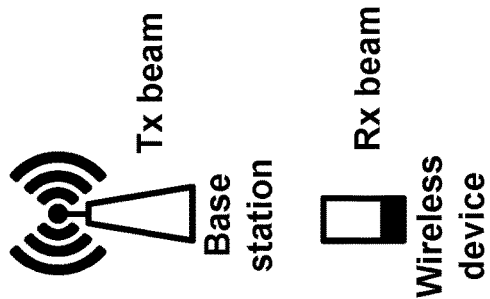
FIG. 12A
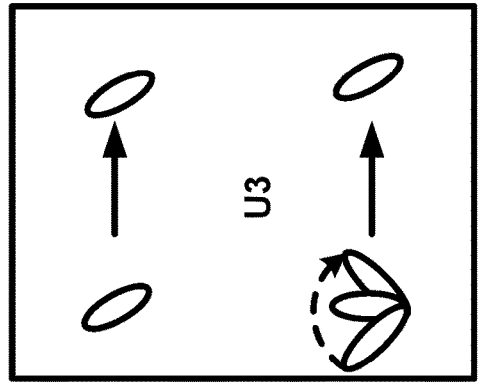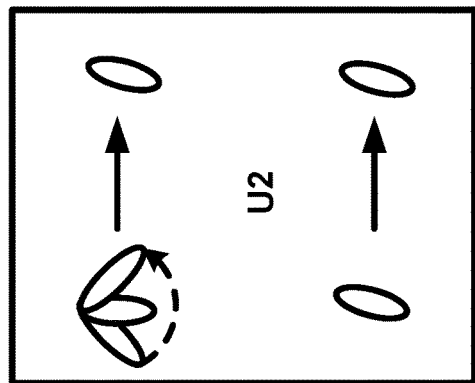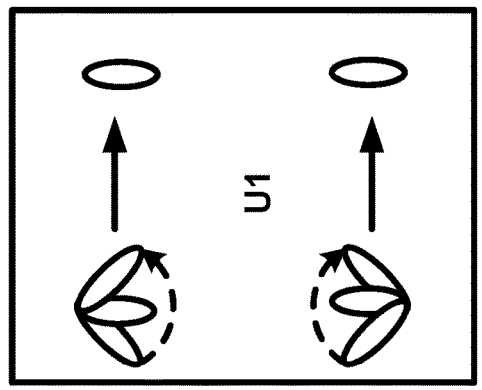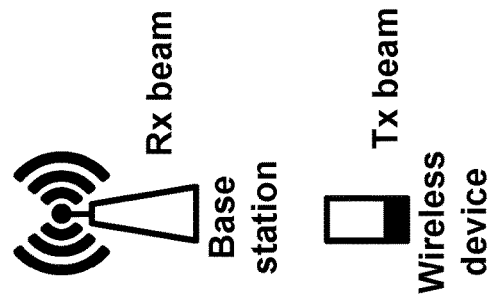
FIG. 12B

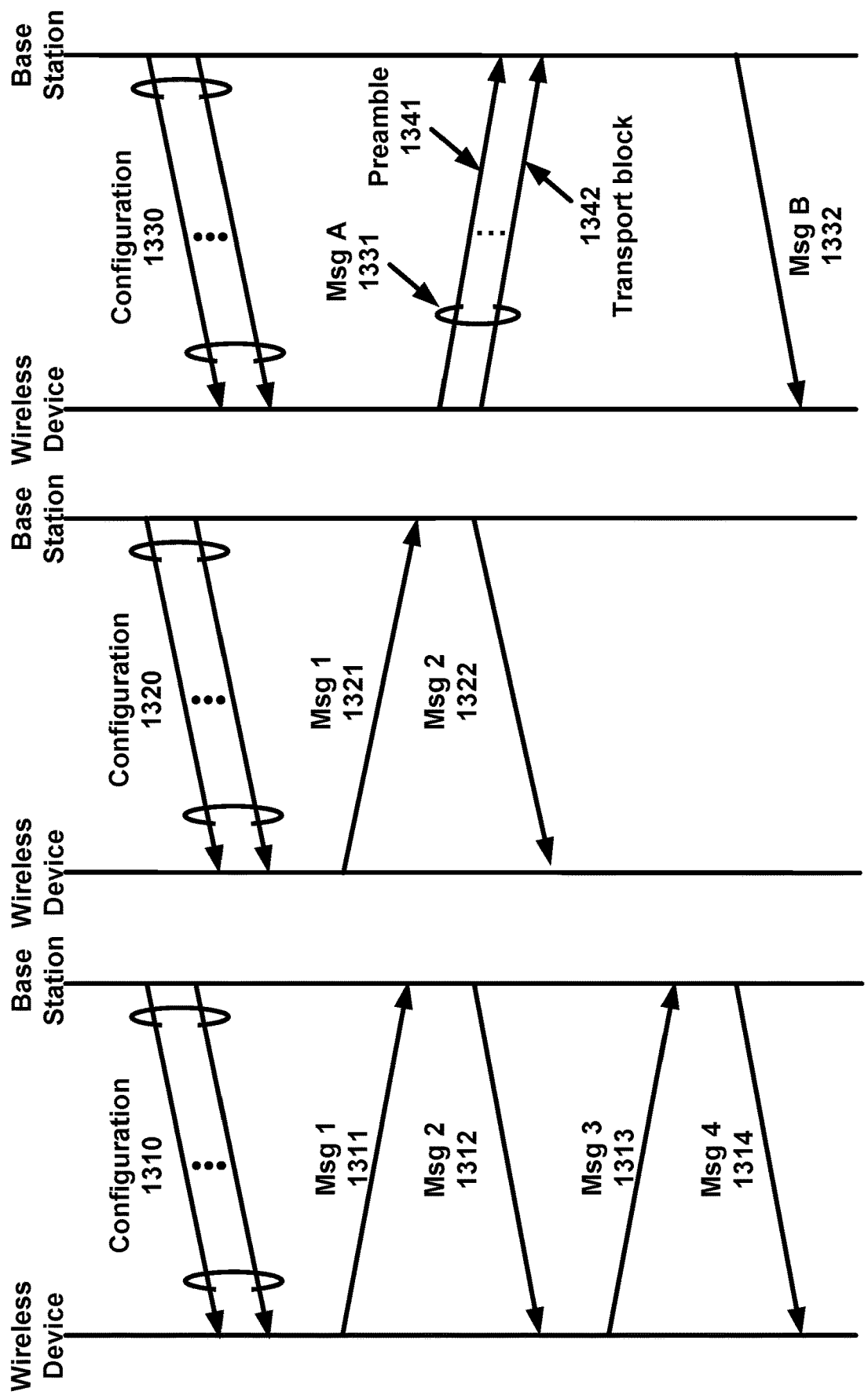

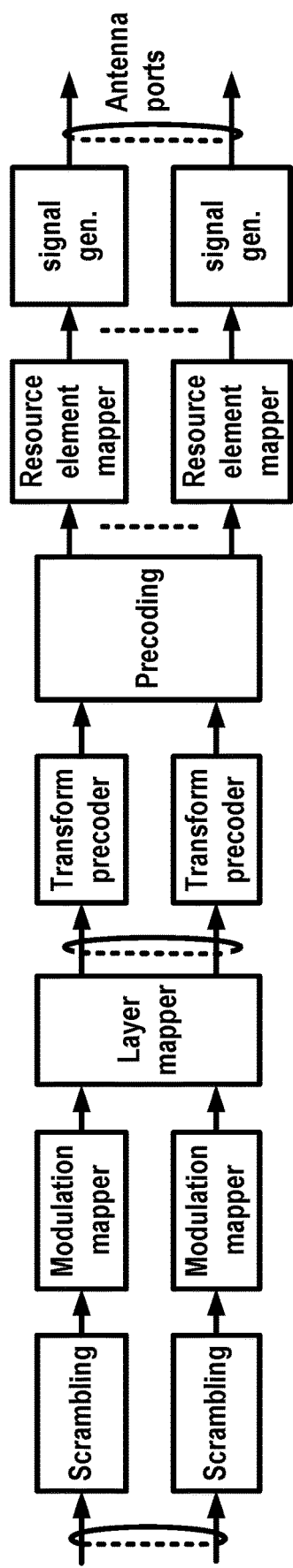
FIG. 16A
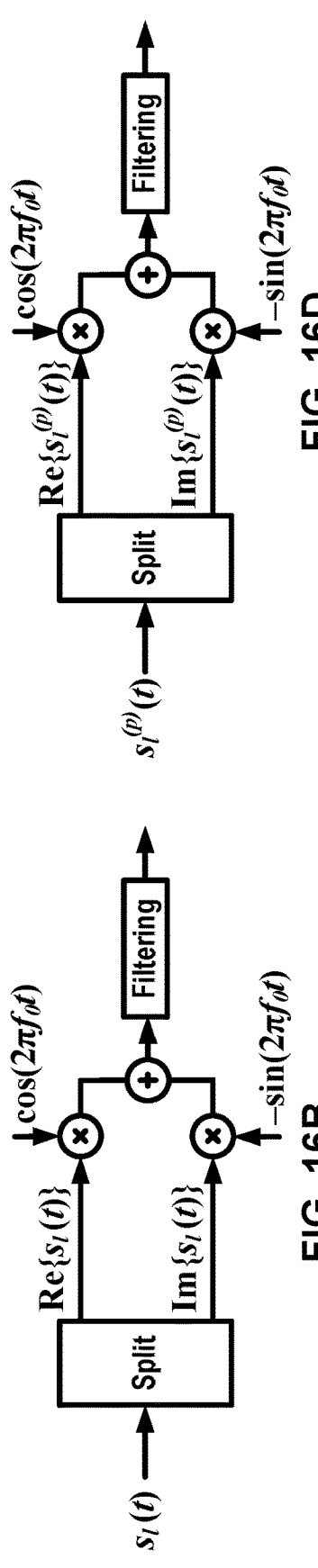
FIG. 16B
FIG. 16D
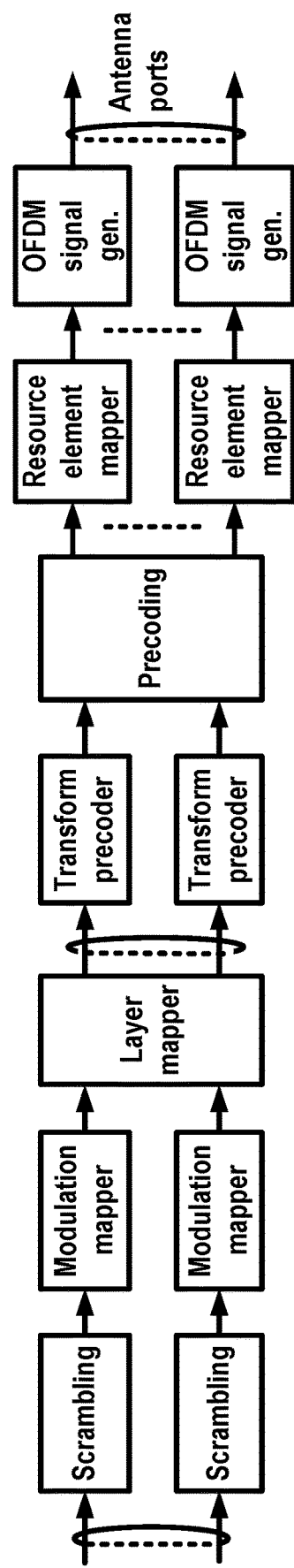
FIG. 16C

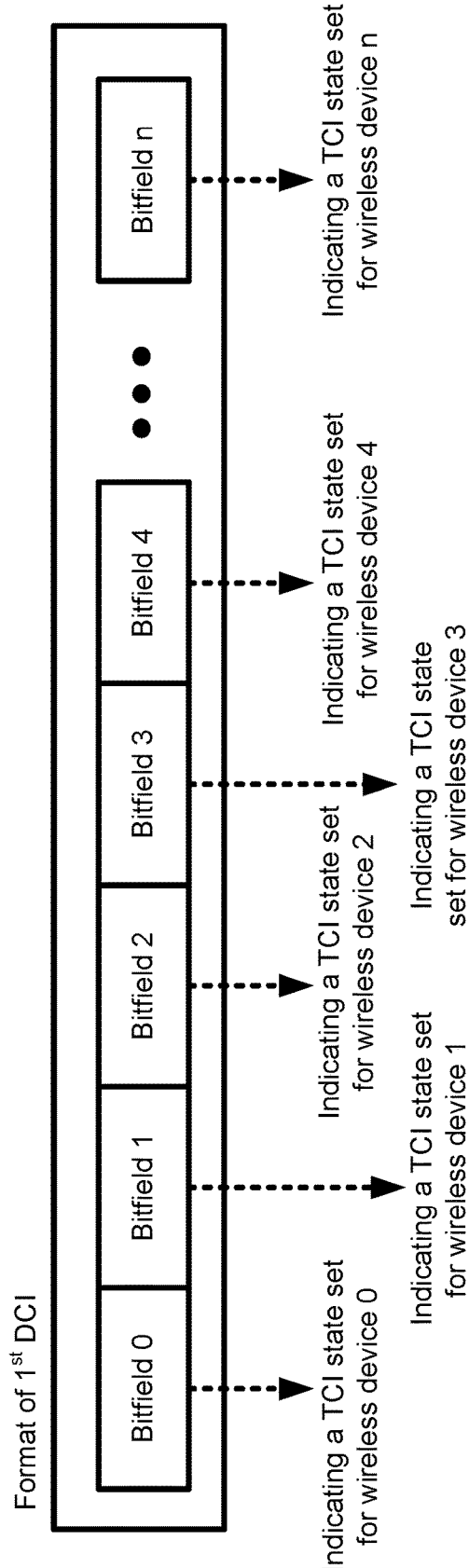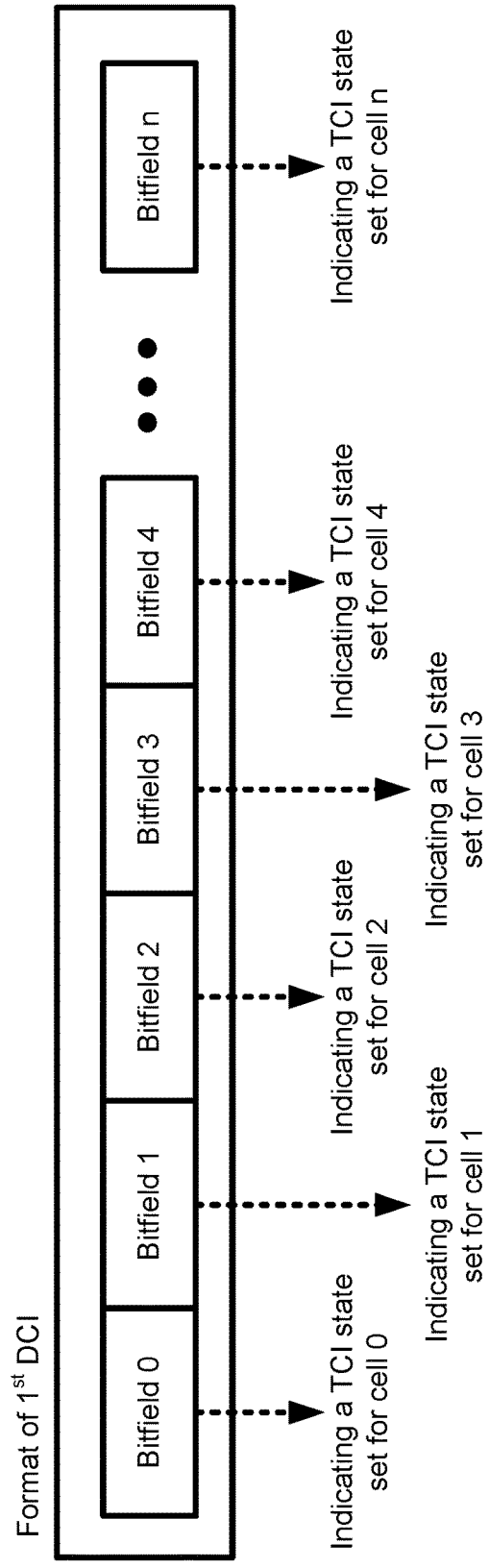
FIG. 22A
FIG. 22B

BEAM INDICATION FOR WIRELESS DEVICES

CROSS-REFERENCE TO RELATED APPLICATIONS

This application claims the benefit of U.S. Provisional Application No. 63/046,355, filed on Jun. 30, 2020. The above-referenced application is hereby incorporated by reference in its entirety.

BACKGROUND

A base station sends control information to a wireless device. The wireless device sends/receives signals based on the control information.

SUMMARY

The following summary presents a simplified summary of certain features. The summary is not an extensive overview and is not intended to identify key or critical elements.

Control information may be used to configure resources for wireless communication between devices. For example, beams to be used by a wireless device and/or a base station for signal transmission/reception may be indicated in control information. Downlink control information (DCI) may comprise indications of beams to be used for signal transmissions and/or receptions by a plurality of wireless devices. A wireless device may be assigned a position, within DCI, where corresponding one or more beams for the wireless device may be indicated. DCI may provide beam indications for multiple wireless device within a same field and/or message (e.g., group common DCI), which may provide advantages such as reduced transmission latency and/or signaling overhead.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 1A and FIG. 1B show example communication networks.

FIG. 5A shows an example mapping for downlink channels.

FIG. 5B shows an example mapping for uplink channels.

FIG. 12A shows examples of downlink beam management procedures.

FIG. 12B shows examples of uplink beam management procedures.

FIG. 13A shows an example four-step random access procedure.

FIG. 13B shows an example two-step random access procedure.

FIG. 13C shows an example two-step random access procedure.

FIG. 16A, FIG. 16B, FIG. 16C, and FIG. 16D show examples of uplink and downlink signal transmission.

FIG. 22A shows an example format of downlink control information (DCI).

FIG. 22B shows an example format of DCI.

DETAILED DESCRIPTION

Figure 2A:
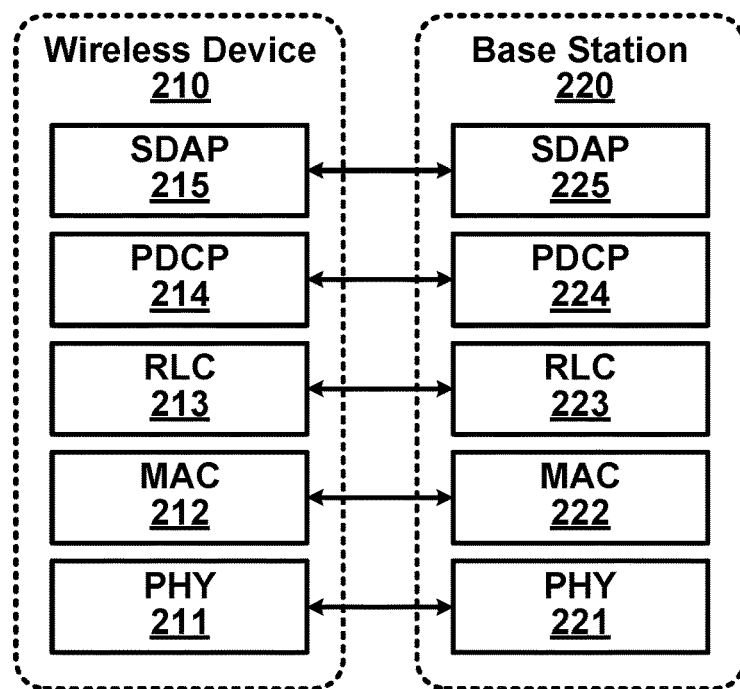
FIG. 2A shows an example user plane.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems. More particularly, the technology disclosed herein may relate to beam management for wireless communication.

FIG. 1A shows an example communication network 100. The communication network 100 may comprise a mobile communication network). The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with one or more DNs 108, such as public DNs (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an access point, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform the substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/configured by other base stations (e.g., macrocell base stations). The small coverage areas may be provided/configured in areas with high data traffic (or so-called "hot-spots") or in areas with a weak macrocell coverage. Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to one or more DNs 170, such as public DNs (e.g., the Internet), private DNs, and/or intra-operator DNs. As part of the interface functionality, the CN 152 (e.g., 5G-CN) may set up end-to-end connections between the wireless device(s) 156 and the one or more DNs, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between a RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QoS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG. 1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng eNBs comprising an ng-eNB 162A and an ng-eNB 162B (collectively ng eNBs 162)). The RAN 154 may comprise one or more of any quantity of types of base station. The gNBs 160 and ng eNBs 162 may be referred to as base stations. The base stations (e.g., the gNBs 160 and ng eNBs 162) may comprise one or more sets of antennas for communicating with the wireless device(s) 156 wirelessly (e.g., an over an air interface). One or more base stations (e.g., the gNBs 160 and/or the ng eNBs 162) may comprise multiple sets of antennas to respectively control multiple cells (or sectors). The cells of the base stations (e.g., the gNBs 160 and the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide Evolved UMTS Terrestrial Radio Access (E UTRA) user plane and control plane protocol terminations towards the wireless device(s) 156 via a Uu interface (e.g., where E UTRA may refer to the 3GPP 4G radio-access technology). A base station (e.g., the ng-eNB 162B) may provide E UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/ or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2B:
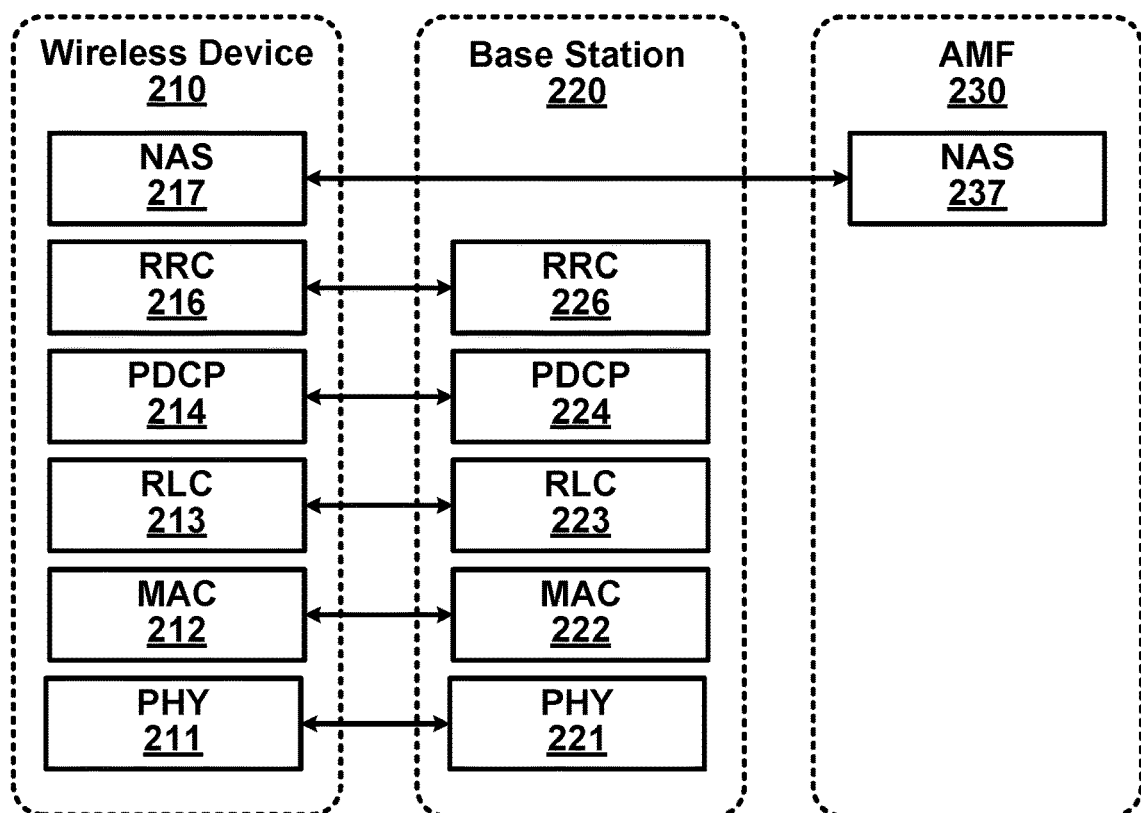
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configuration and/or the control plane configuration may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG. 2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

Figure 3:
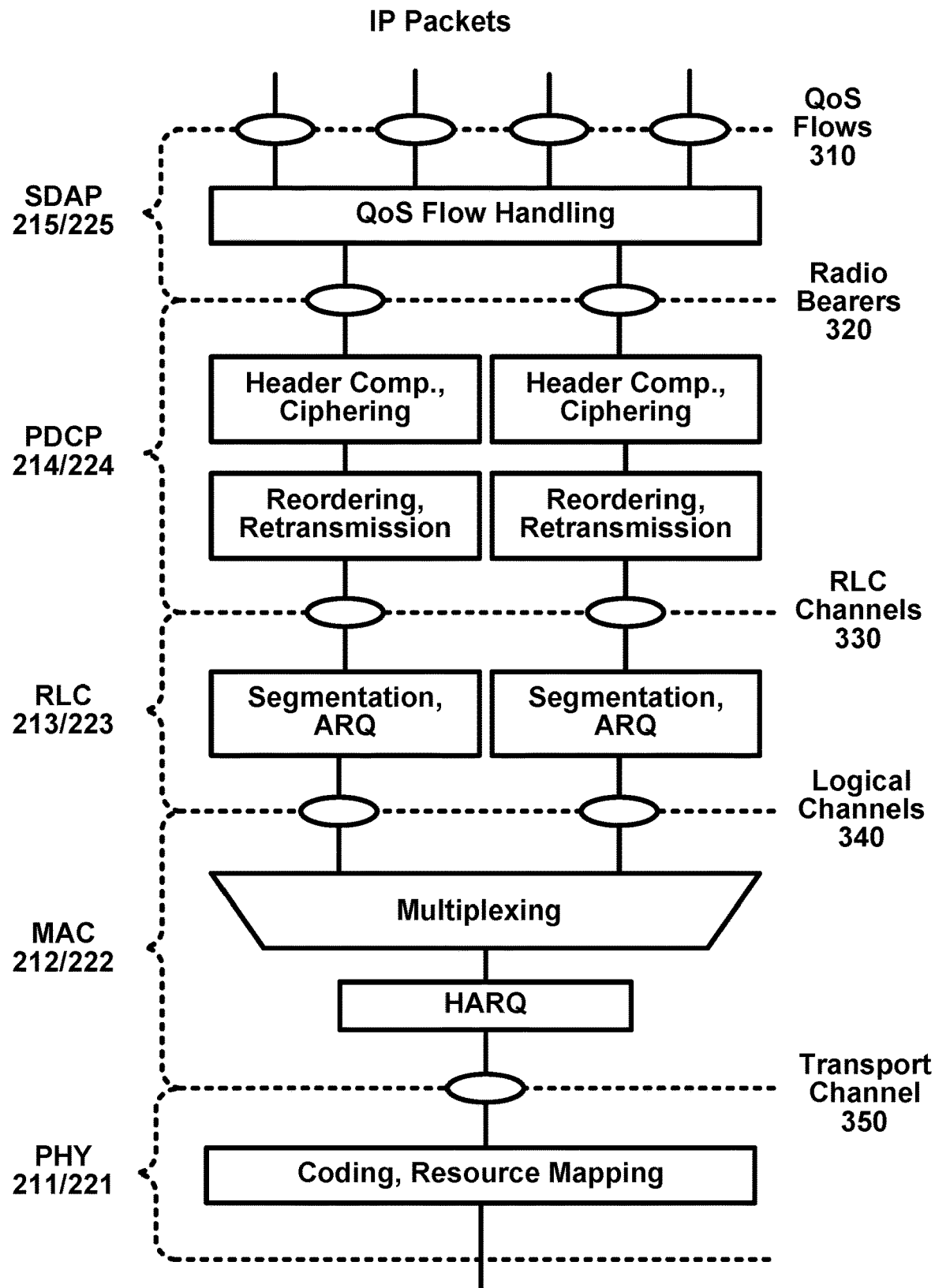
FIG. 3 shows example of protocol layers.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform Quality of Service (QoS) flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be transmitted over the air interface, ciphering/deciphering to prevent unauthorized decoding of data transmitted over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity scenario/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers may perform one or more of the noted functions, for example, based on the transmission mode an RLC layer is operating. The RLC configuration may be per logical channel. The RLC configuration may not depend on numerologies and/or Transmission Time Interval (TTI) durations (or other durations). The RLC layers (e.g., RLCs 213 and 223) may provide/configure RLC channels as a service to the PDCP layers (e.g., PDCPs 214 and 224, respectively), such as shown in FIG. 3.

The MAC layers (e.g., MACs 212 and 222) may perform multiplexing/demultiplexing of logical channels and/or mapping between logical channels and transport channels. The multiplexing/demultiplexing may comprise multiplexing/demultiplexing of data units/data portions, belonging to the one or more logical channels, into/from Transport Blocks (TBs) delivered to/from the PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively). Various operations described herein with reference to communication devices (e.g., base stations, a wireless devices, etc.) may be performed by one or more entities in the communication device (e.g., a PHY layer entity, a MAC layer entity, and/or one or more other entities corresponding to any other layer in the communication device).

Figure 4A:
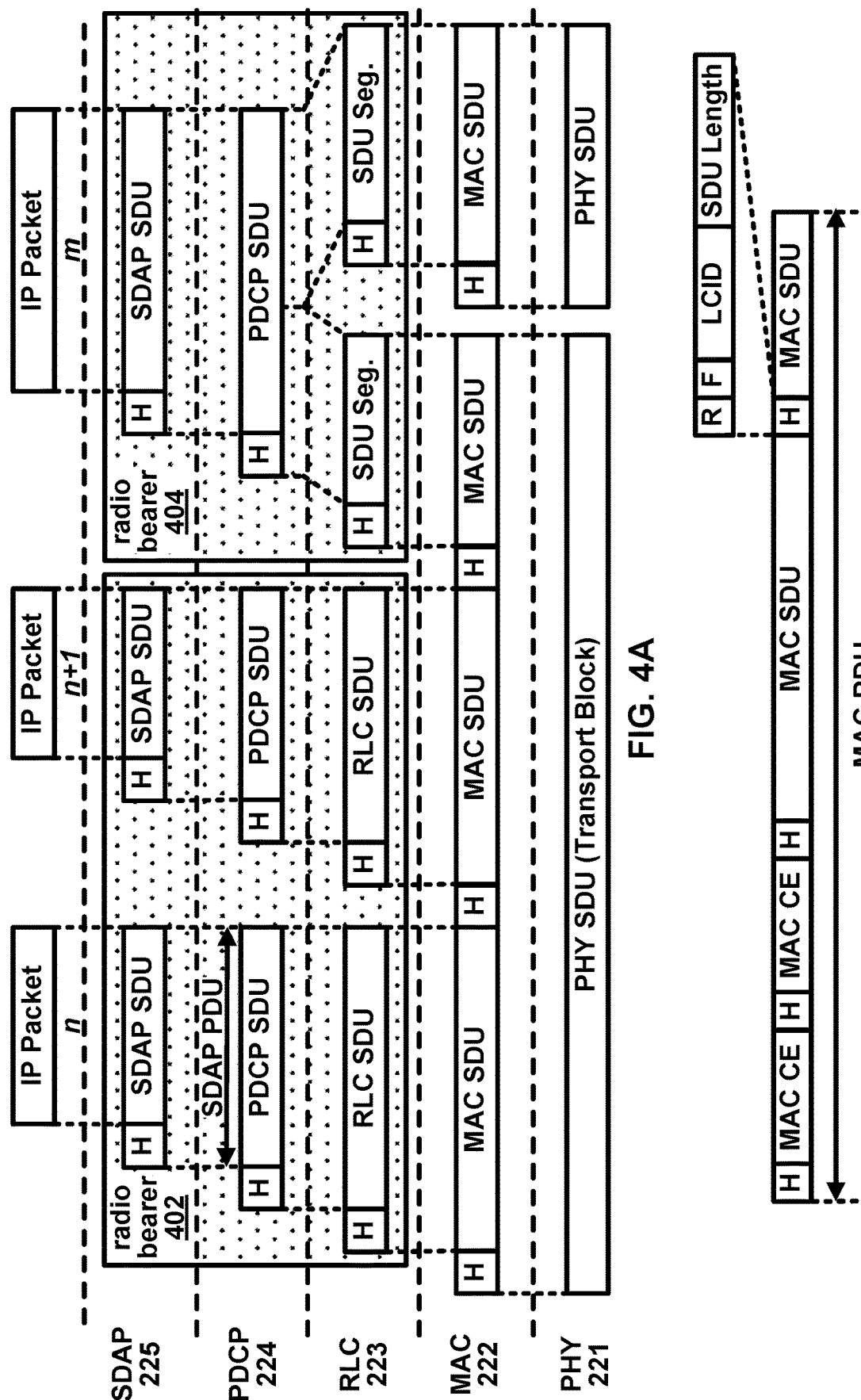
FIG. 4A shows an example downlink data flow for a user plane configuration.

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol laters may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration). The NR MAC PDU structure may reduce a processing time and/or associated latency, for example, if the MAC PDU subheaders are computed before assembling the full MAC PDU.

Figure 4B:
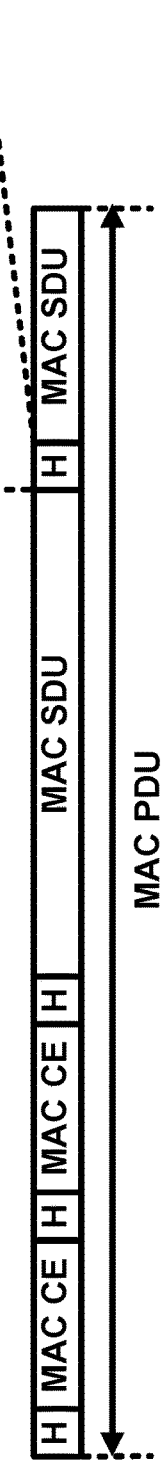
FIG. 4B shows an example format of a Medium Access Control (MAC) subheader in a MAC Protocol Data Unit (PDU).

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 223 or MAC 222. As shown in FIG. 4B, two MAC CEs may be inserted/added before two MAC PDUs. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

FIG. 5A shows an example mapping for downlink channels. The mapping for uplink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless device).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIBs). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIBs from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may have an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The physical layer may generate physical signals to support the low-level operation of the physical layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), sounding reference signals (SRS), phase-tracking reference signals (PT RS), and/or any other signals.

One or more of the channels (e.g., logical channels, transport channels, physical channels, etc.) may be used to carry out functions associated with the control plan protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHY 211 and 221, MAC 212 and 222, RLC 213 and 223, and PDCP 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be sent/transmitted between the wireless device 210 and the RAN (e.g., the base station 220) using signaling radio bearers and the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting (e.g., the wireless device measurement reporting) and control of the reporting; detection of and recovery from radio link failure (RLF); and/or NAS message transfer. As part of establishing an RRC connection, RRC layers 216 and 226 may establish an RRC context, which may involve configuring parameters for communication between the wireless device 210 and the RAN (e.g., the base station 220).

Figure 6:
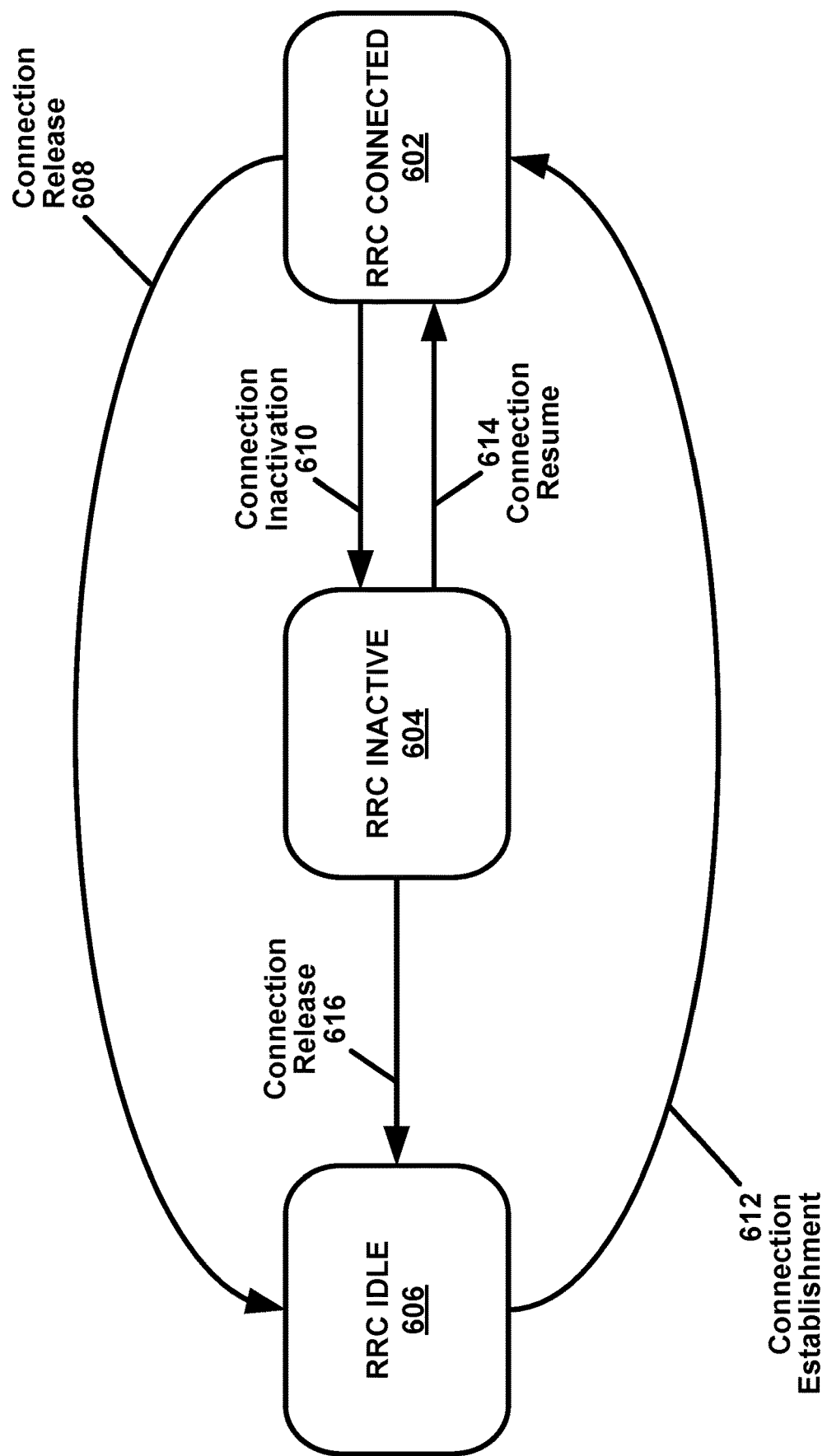
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_INACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by an RAN (e.g., the RAN 104 or the NG RAN 154). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., RRC connected 602) to an RRC idle state (e.g., the RRC idle 606) via a connection release procedure 608. The RRC state may transition from the RRC connected state (e.g., RRC connected 602) to the RRC inactive state (e.g., RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., each discontinuous reception (DRX) cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be the same as or similar to connection release procedure 608.

An RRC state may be associated with a mobility management mechanism. During the RRC idle state (e.g., RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC idle state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the 5G CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the UE registration area, for example, if the wireless device moves (e.g., via a cell reselection) to a cell associated with a TAI that may not be included in the list of TAIs associated with the UE registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 604).

A base station (e.g., gNBs 160 in FIG. 1B or any other base station) may be split in two parts: a central unit (e.g., a base station central unit, such as a gNB CU) and one or more distributed units (e.g., a base station distributed unit, such as a gNB DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM is a multicarrier communication scheme that sends/transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbols may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

Figure 7:
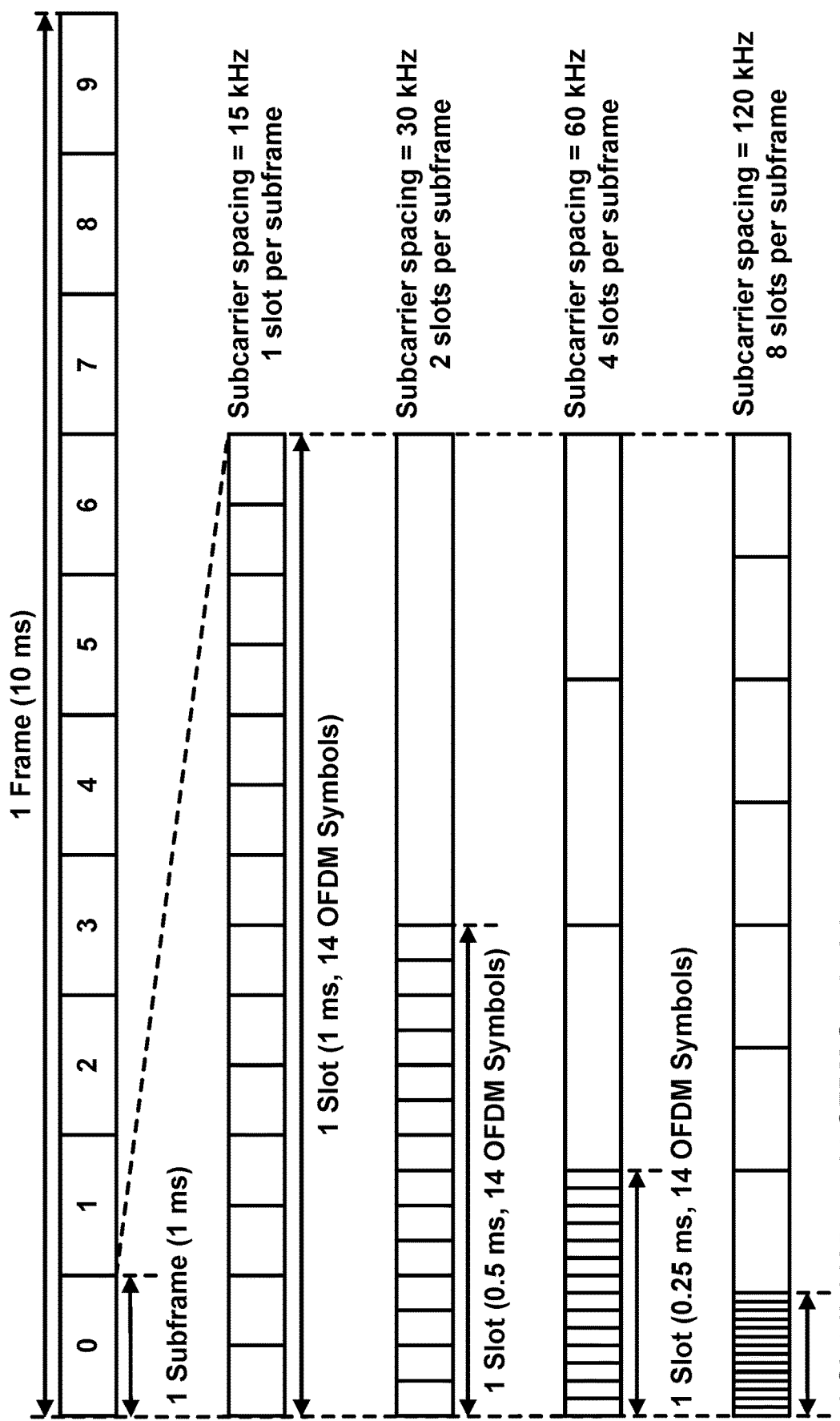
FIG. 7 shows an example configuration of a frame.

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 µs, for example, for a numerology in an NR configuration or any other radio configurations. Numerologies may be defined with the following subcarrier spacing/cyclic prefix duration combinations: 15 kHz/4.7 µs; 30 kHz/2.3 µs; 60 kHz/1.2 µs; 120 kHz/0.59 µs; 240 kHz/0.29 µs, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
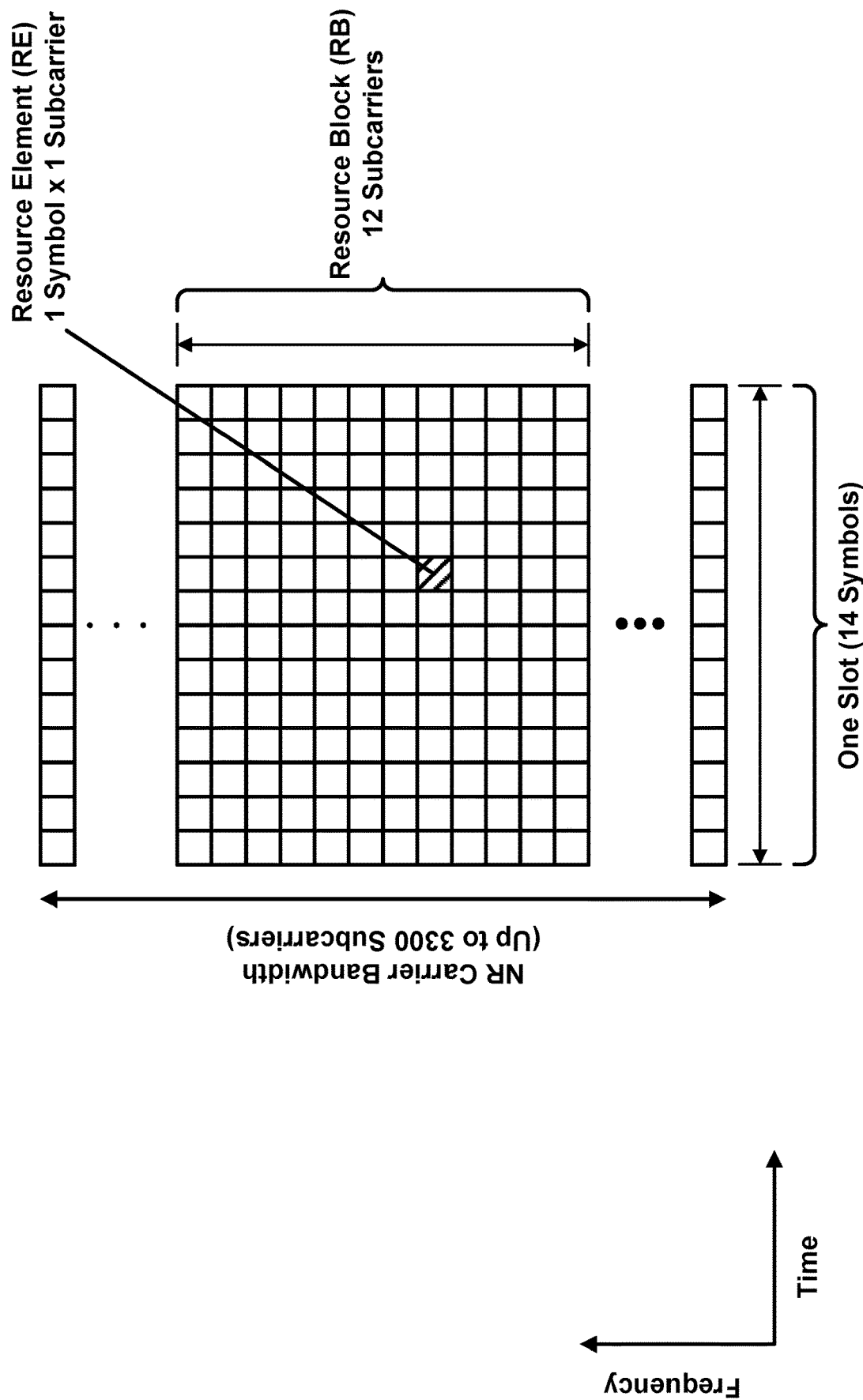
FIG. 8 shows an example resource configuration of one or more carriers.

FIG. 8 shows an example resource configuration of one or more carriers. The resource configuration of may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESETS, for example, for a downlink BWP in a set of configured downlink BWPs on a primary cell (PCell) or on a secondary cell (SCell). A search space may comprise a set of locations in the time and frequency domains where the wireless device may monitor/ find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/ comprised in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, after (e.g., based on or in response to) receiving DCI indicating the second BWP as an active BWP. A wireless device may switch an active BWP from a first BWP to a second BWP, for example, after (e.g., based on or in response to) an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
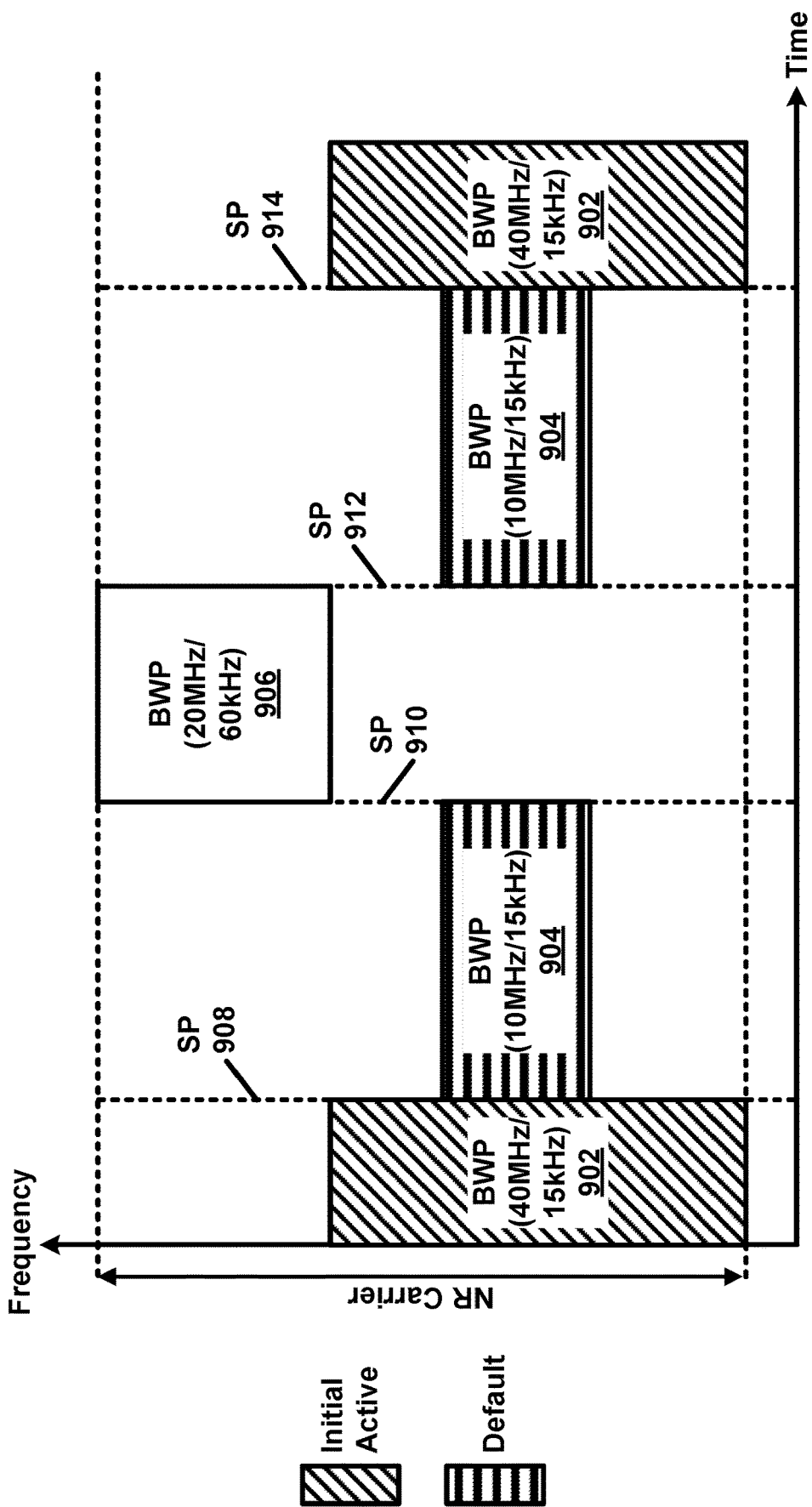
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP 904 may be a default BWP. The wireless device may switch between BWPs at switching points. The wireless device may switch from the BWP 902 to the BWP 904 at a switching point 908. The switching at the switching point 908 may occur for any suitable reasons. The switching at a switching point 908 may occur, for example, after (e.g., based on or in response to) an expiry of a BWP inactivity timer (e.g., indicating switching to the default BWP). The switching at the switching point 908 may occur, for example, after (e.g., based on or in response to) receiving DCI indicating BWP 904 as the active BWP. The wireless device may switch at a switching point 910 from an active BWP 904 to the BWP 906, for example, after or in response receiving DCI indicating BWP 906 as a new active BWP. The wireless device may switch at a switching point 912 from an active BWP 906 to the BWP 904, for example, after (e.g., based on or in response to) an expiry of a BWP inactivity timer. The wireless device may switch at the switching point 912 from an active BWP 906 to the BWP 904, for example, after or in response receiving DCI indicating BWP 904 as a new active BWP. The wireless device may switch at a switching point 914 from an active BWP 904 to the BWP 902, for example, after or in response receiving DCI indicating the BWP 902 as a new active BWP.

Wireless device procedures for switching BWPs on a secondary cell may be the same/similar as those on a primary cell, for example, if the wireless device is configured for a secondary cell with a default downlink BWP in a set of configured downlink BWPs and a timer value. The wireless device may use the timer value and the default downlink BWP for the secondary cell in the same/similar manner as the wireless device uses the timer value and/or default BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously sent/transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain.

Figure 10A:
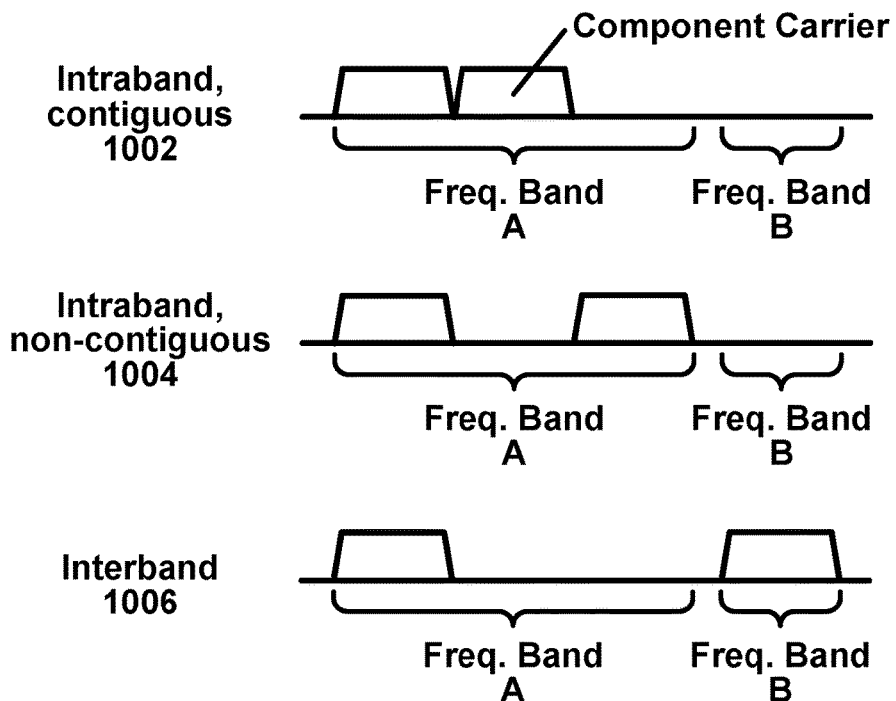
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless device may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, after (e.g., based on or in response to) an expiration of an SCell deactivation timer (e.g., one SCell deactivation timer per SCell may be configured).

DCI may comprise control information, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling. Uplink control information (UCI) may comprise control information, such as HARQ acknowledgments and channel state feedback (e.g., CQI, PMI, and/or RI) for aggregated cells. UCI may be sent/transmitted via an uplink control channel (e.g., a PUCCH) of the PCell or a certain SCell (e.g., an SCell configured with PUCCH). For a larger number of aggregated downlink CCs, the PUCCH of the PCell may become overloaded. Cells may be divided into multiple PUCCH groups.

Figure 10B:
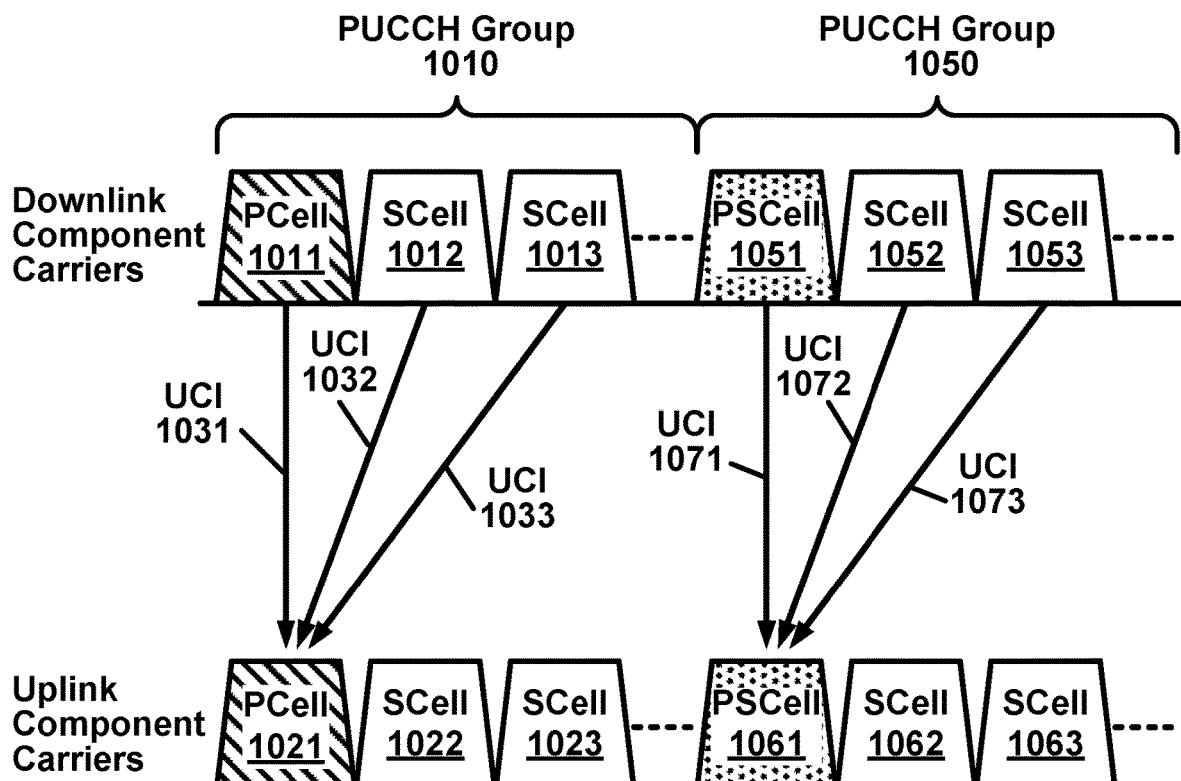
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be sent/transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) sent/transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
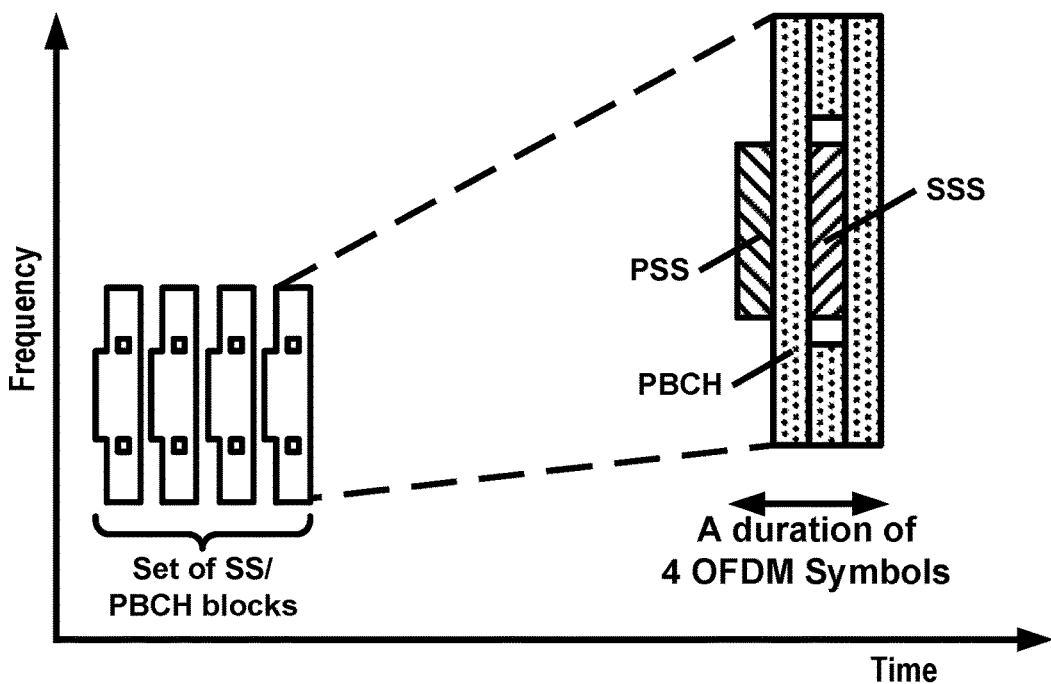
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RSs for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial Rx parameters). The wireless device may not assume QCL for SS/PBCH block transmissions having different SS/PBCH block indices. SS/PBCH blocks (e.g., those within a half-frame) may be sent/transmitted in spatial directions (e.g., using different beams that span a coverage area of the cell). A first SS/PBCH block may be sent/transmitted in a first spatial direction using a first beam, a second SS/PBCH block may be sent/transmitted in a second spatial direction using a second beam, a third SS/PBCH block may be sent/transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine channel state information (CSI). The base station may configure the wireless device with one or more CSI-RSs for channel estimation or any other suitable purpose. The base station may configure a wireless device with one or more of the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RSs may be sent/transmitted by a base station and received/used by a wireless device for a channel estimation. The downlink DM-RSs may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g. a maximum number/quantity) of front-loaded DM-RS symbols for a PDSCH. A DM-RS configuration may support one or more DM-RS ports. A DM-RS configuration may support up to eight orthogonal downlink DM-RS ports per wireless device (e.g., for single user-MIMO). A DM-RS configuration may support up to 4 orthogonal downlink DM-RS ports per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RSs for a PDSCH (e.g., up to 3 DMRSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RSs may be configured to send/transmit at one or more symbols of a PUSCH and/or a PUCCH. The base station may semi-statically configure the wireless device with a number/quantity (e.g. the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RSs (e.g., up to three DMRSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in a SRS resource set of the one or more SRS resource sets (e.g., with the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as quasi co-located (QCLed), for example, if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
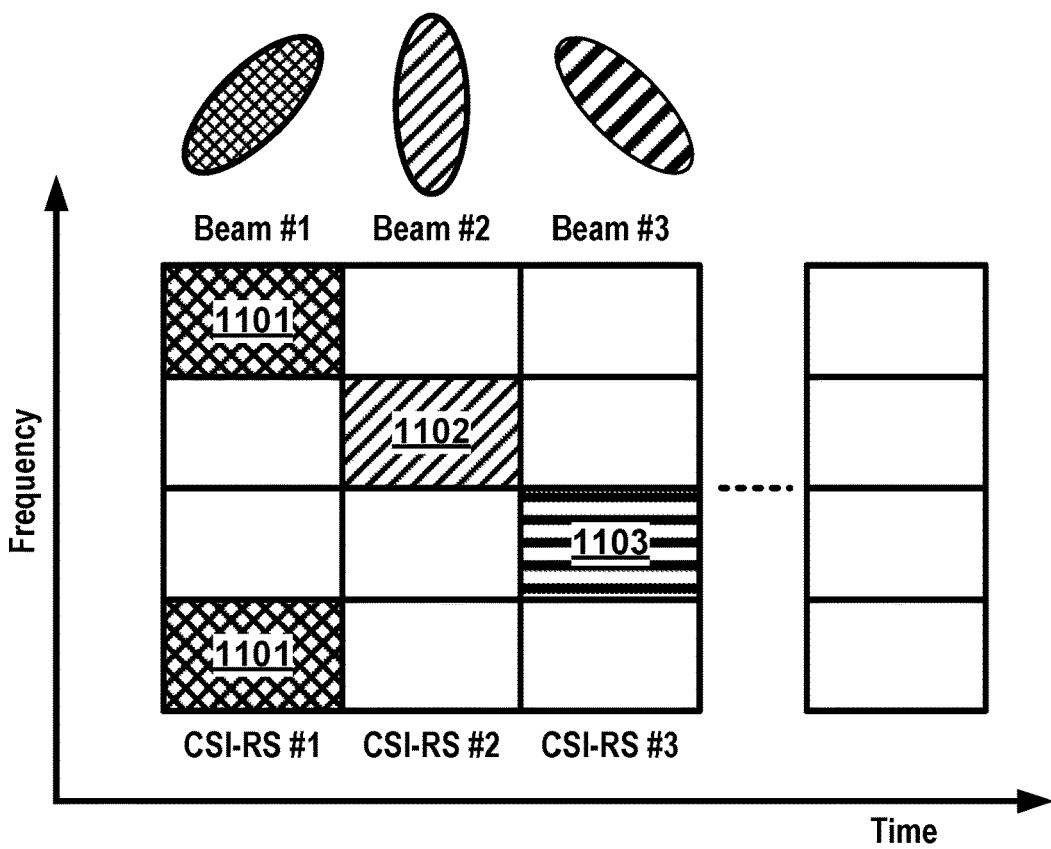
FIG. 11B shows an example mapping of one or more channel state information reference signals (CSI-RSs).

FIG. 11B shows an example mapping of one or more CSI-RSs. The CSI-RSs may be mapped in the time and frequency domains. Each rectangular block shown in FIG. 11B may correspond to a resource block (RB) within a bandwidth of a cell. A base station may send/transmit one or more RRC messages comprising CSI-RS resource configuration parameters indicating one or more CSI-RSs. One or more of parameters may be configured by higher layer signaling (e.g., RRC and/or MAC signaling) for a CSI-RS resource configuration. The one or more of the parameters may comprise at least one of: a CSI-RS resource configuration identity, a number of CSI-RS ports, a CSI-RS configuration (e.g., symbol and resource element (RE) locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

One or more beams may be configured for a wireless device in a wireless device-specific configuration. Three beams are shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RSs 1101, 1102, 1103) may be sent/transmitted by the base station and used by the wireless device for one or more measurements. The wireless device may measure an RSRP of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more sounding reference signal (SRS) resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a precoding matrix indicator (PMI), a channel quality indicator (CQI), and/or a rank indicator (RI).

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counter-clockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows).

Procedure P2 may be used to enable a measurement (e.g., a wireless device measurement) on Tx beams of a TRP (shown, in the top row of P2, as ovals rotated in a counter-clockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the top row of U1 and bottom row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the UE uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more reference signals (RSs) comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RSs of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are similar or the same as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random access procedure to request one or more system information blocks (SIBs) (e.g., other system information blocks, such as SIB2, SIB3, and/or the like). The wireless device may initiate/start/perform the random access procedure for a beam failure recovery request. A network may initiate/start/perform a random access procedure, for example, for a handover and/or for establishing time alignment for an SCell addition.

FIG. 13A shows an example four-step random access procedure. The four-step random access procedure may comprise a four-step contention-based random access procedure. A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more random access channel (RACH) parameters to the wireless device. The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-configDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313). The wireless device may determine a reception timing and a downlink channel for receiving the second message (e.g., Msg 2 1312) and the fourth message (e.g., Msg 4 1314), for example, based on the one or more RACH parameters.

The one or more RACH parameters provided/configured/comprised in the configuration message 1310 may indicate one or more Physical RACH (PRACH) occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RSs). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The wireless device may perform a preamble retransmission, for example, if no response is received after (e.g., based on or in response to) a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/number of preamble transmissions and/or retransmissions, for example, using a counter parameter (e.g., PREAMBLE_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTransMax) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, after (e.g., based on or in response to) the sending/transmitting of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-ResponseWindow) to monitor a PDCCH for the second message (e.g., Msg 2 1312), for example, after sending/transmitting the first message (e.g., Msg 1 1311) (e.g., a preamble). The wireless device may determine the start time of the time window, for example, based on a PRACH occasion that the wireless device uses to send/transmit the first message (e.g., Msg 1

1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type1-PDCCH common search space) configured by an RRC message. The wireless device may identify/determine the RAR, for example, based on an RNTI. Radio network temporary identifiers (RNTIs) may be used depending on one or more events initiating/starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

$$RA\text{-}RNTI = 1 + s\_id + 14 \times t\_id + 14 \times 80 \times f\_id + 14 \times 80 \times 8 \times ul\_carrier\_id$$

where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤fid<8), and ul_carrier_id may be a UL carrier used for a preamble transmission (e.g., 0 for an NUL carrier, and 1 for an SUL carrier).

The wireless device may send/transmit the third message (e.g., Msg 3 1313), for example, after (e.g., based on or in response to) a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another the wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, after (e.g., based on or in response to) the sending/transmitting of the third message (e.g., Msg 3 1313). The base station may address the wireless device on the PDCCH (e.g., the base station may send the PDCCH to the wireless device) using a C-RNTI, for example, if the C-RNTI was included in the third message (e.g., Msg 3 1313). The random access procedure may be determined to be successfully completed, for example, if the unique C RNTI of the wireless device is detected on the PDCCH (e.g., the PDCCH is scrambled by the C-RNTI). Fourth message (e.g., Msg 4 1314) may be received using a DL-SCH associated with a TC RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., between the Msg 1 1311 and the Msg 3 1313). The wireless device may determine and/or switch an uplink carrier for the first message (e.g., Msg 1 1311) and/or the third message (e.g., Msg 3 1313), for example, based on a channel clear assessment (e.g., a listen-before-talk).

FIG. 13B shows a two-step random access procedure. The two-step random access procedure may comprise a two-step contention-free random access procedure. Similar to the four-step contention-based random access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-ResponseWindow) to monitor a PDCCH for the RAR, for example, after (e.g., based on or in response to) sending/transmitting the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after sending/transmitting a beam failure recovery request (e.g., the window may start any quantity of symbols and/or slots after transmitting the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, after (e.g., based on or in response to) transmitting first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

Msg A 1320 may be sent/transmitted in an uplink transmission by the wireless device. Msg A 1320 may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, after (e.g., based on or in response to) sending/transmitting the first message (e.g., Msg A 1331). The second message (e.g., Msg B 1332) may comprise contents that are similar and/or equivalent to the contents of the second message (e.g., Msg 2 1312) (e.g., an RAR shown in FIG. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332) corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as downlink control information (DCI). The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCIs may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as "FFFE" in hexadecimal. DCI having CRC parity bits scrambled with a system information RNTI (SI-RNTI) may indicate a broadcast transmission of the system information. The SI-RNTI may be predefined as "FFFF" in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCIs with one or more DCI formats, for example, depending on the purpose and/or content of the DCIs. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format(s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number of contiguous control channel elements (CCEs), for example, based on a payload size of the DCI and/or a coverage of the base station. The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
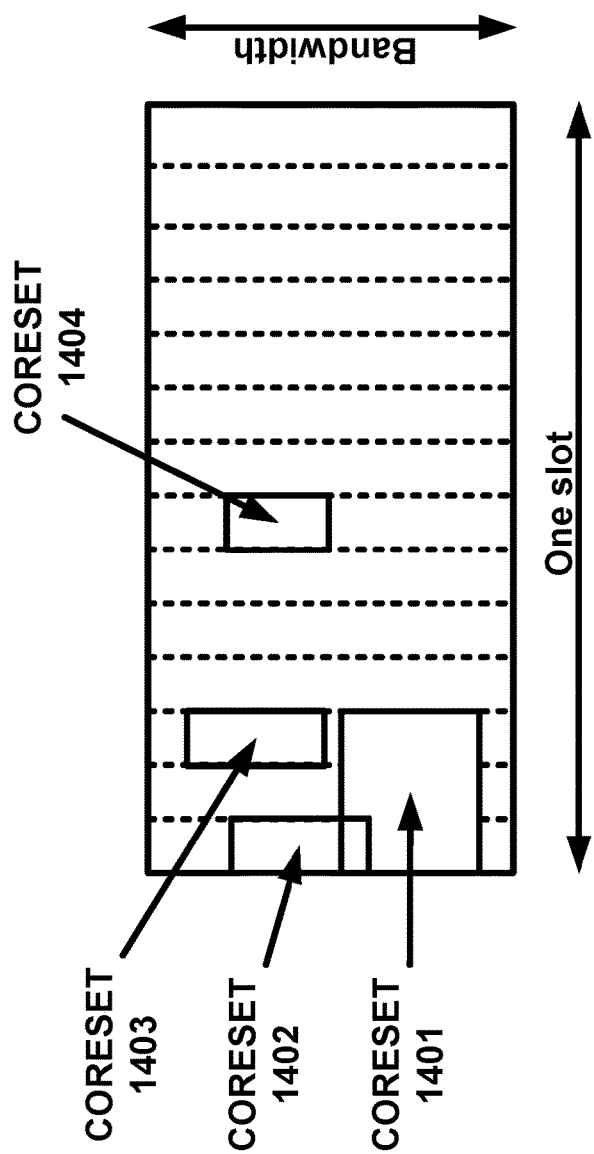
FIG. 14A shows an example of control resource set (CORESET) configurations.

FIG. 14A shows an example of CORESET configurations. The CORESET configurations may be for a bandwidth part or any other frequency bands. The base station may send/transmit DCI via a PDCCH on one or more control resource sets (CORESETs). A CORESET may comprise a time-frequency resource in which the wireless device attempts/tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORESET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number of resource blocks in frequency domain.

Figure 14B:
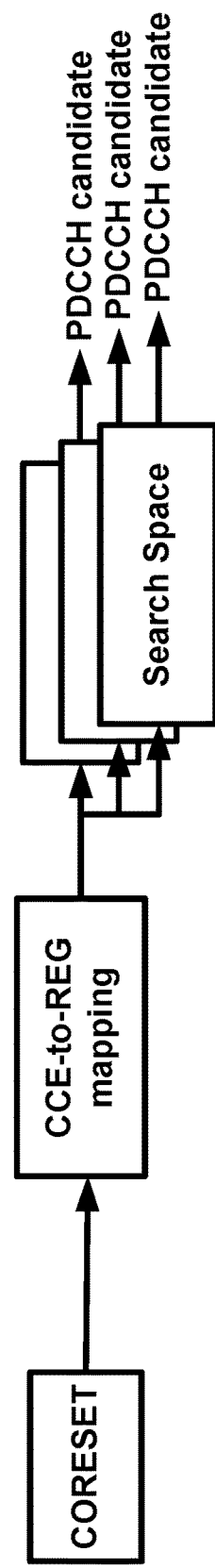
FIG. 14B shows an example of a control channel element to resource element group (CCE-to-REG) mapping.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a number (e.g., at most 10) of search space sets configured on/for the CORESET, for example, based on the one or more RRC messages. The wireless device may monitor a set of PDCCH candidates according to configuration parameters of a search space set. The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the number of CCEs, the number of PDCCH candidates in common search spaces, and/or the number of PDCCH candidates in the wireless device-specific search spaces) and possible (or configured) DCI formats. The decoding may be referred to as blind decoding. The wireless device may determine DCI as valid for the wireless device, for example, after (e.g., based on or in response to) CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The wireless device may send/transmit uplink control signaling (e.g., UCI) to a base station. The uplink control signaling may comprise HARQ acknowledgements for received DL-SCH transport blocks. The wireless device may send/transmit the HARQ acknowledgements, for example, after (e.g., based on or in response to) receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise scheduling requests (SR). The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a number of OFDM symbols (e.g., between four and fourteen OFDM symbols) and may comprise two or fewer bits. The wireless device may use PUCCH format 1, for example, if the transmission is over/via four or more symbols and the number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from the PUCCH resource set for UCI (HARQ-ACK, CSI, and/or SR) transmission, for example, after determining a PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
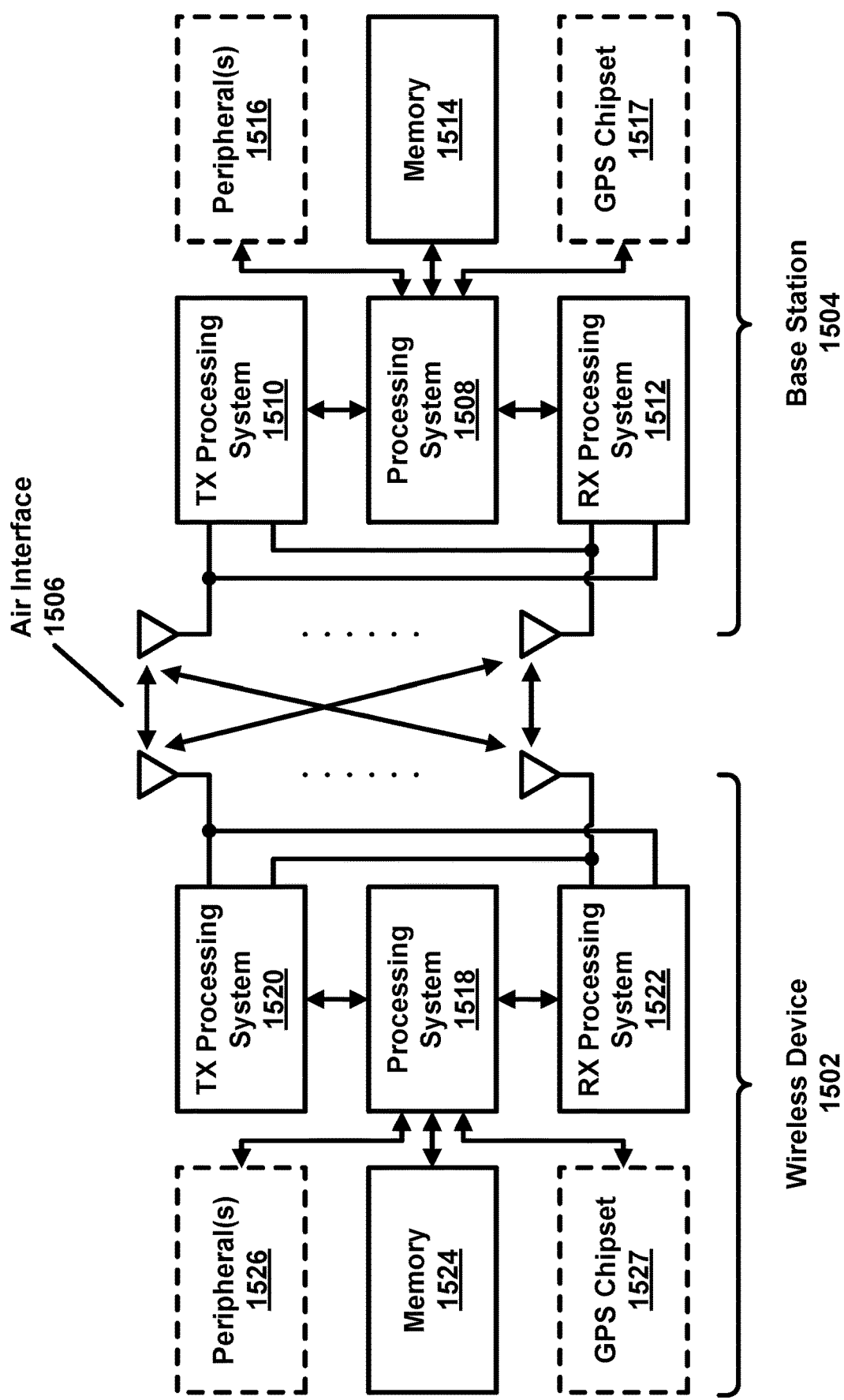
FIG. 15A shows an example of communications between a wireless device and a base station.

FIG. 15A shows an example communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For sending/transmision processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
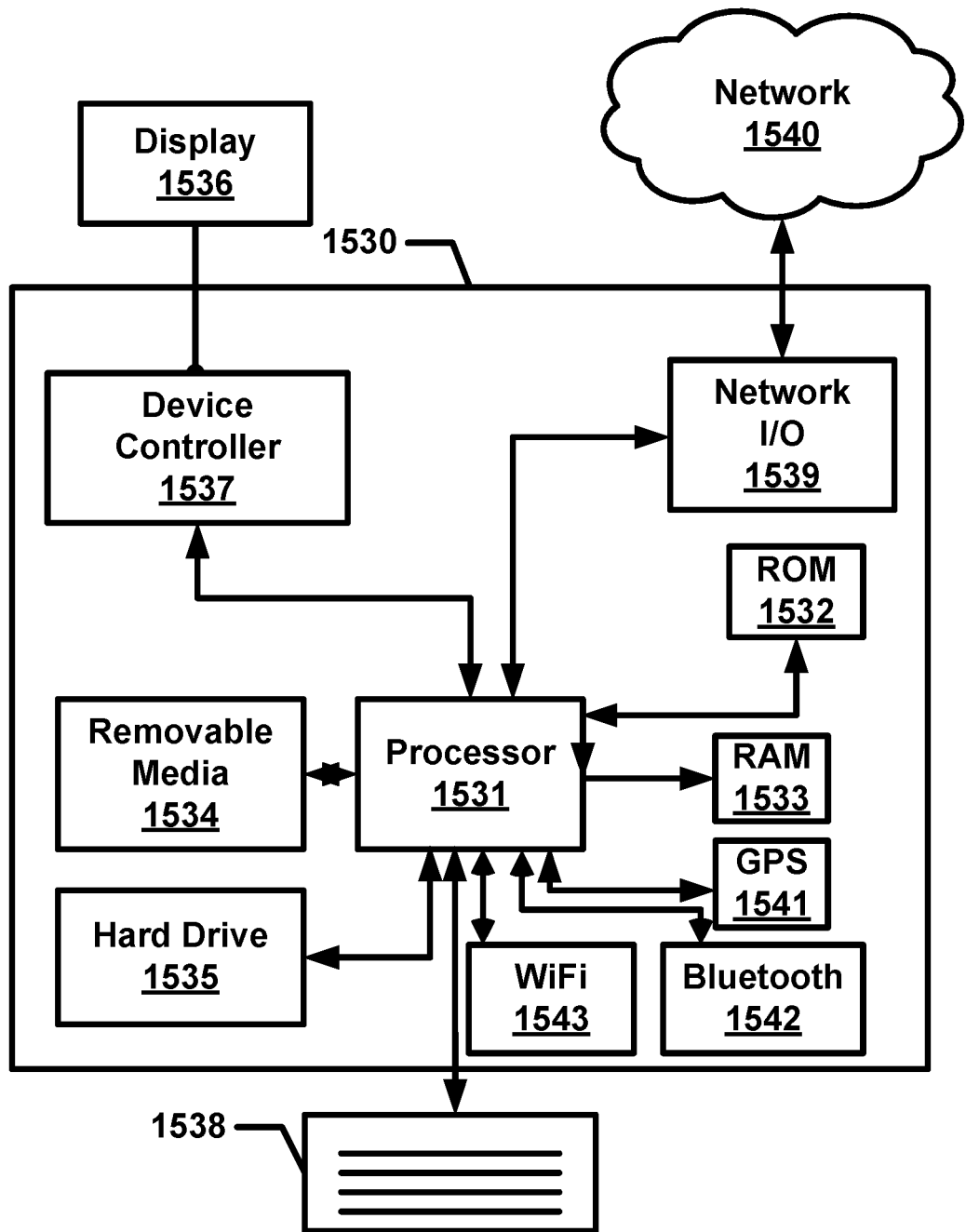
FIG. 15B shows example elements of a computing device that may be used to implement any of the various devices described herein.

FIG. 15B shows example elements of a computing device that may be used to implement any of the various devices described herein, including, for example, the base station 160A, 160B, 162A, 162B, 220, and/or 1504, the wireless device 106, 156A, 156B, 210, and/or 1502, or any other base station, wireless device, AMF, UPF, network device, or computing device described herein. The computing device 1530 may include one or more processors 1531, which may execute instructions stored in the random-access memory (RAM) 1533, the removable media 1534 (such as a Universal Serial Bus (USB) drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc. The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a global positioning system (GPS) microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency. The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, if it is started, and continue running until it is stopped or until it expires. A timer may be started, for example, if it is not running or restarted if it is running A timer may be associated with a value (e.g., the timer may be started or restarted from a value or may be started from zero and expire if it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

Wireless communications may use (and/or require) various levels of quality and/or services. Demand for services, such as a high quality of services (e.g., video services for streaming video, teleconferencing, any service requiring high data throughput), may occur and/or may increase for various wireless communications (e.g., 3GPP communications, such as 3GPP new radio (NR) communications or 5G, 6G, any other generation and/or release of 3GPP, and/or any non-3GPP communications). Provisioning high quality services may require more advanced wireless communication techniques, for example, to mitigate interference (e.g., inter-cell/intracell interference), increase throughput, and/or increase coverage. One or more techniques to mitigate interference, increase throughput, and/or increase coverage may comprise beamforming. A base station and/or a wireless device may be configured with multiple antennas to support transmission and/or reception based on beamforming. The base station and/or the wireless device may perform one or more beam management procedures, for example, if configured with the multiple antennas and/or for beamforming-based transmission/reception. The wireless device may perform a beam management procedure based on one or more CSI-RSs, one or more SSBs, and/or one or more DMRSs. The wireless device may measure a channel quality of a beam pair link (e.g., for the beam management procedure). The beam pair link may comprise a transmitting beam from the base station (e.g., for signal transmissions from the base station) and a receiving beam at the wireless device (e.g., for signal reception at the wireless device). The wireless device may measure radio link qualities of the multiple beam pair links between the base station and the wireless device, for example, if configured with multiple beams associated with multiple CSI-RSs, SSBs and/or DMRSs. The wireless device may send/transmit one or more beam measurement reports (e.g., beam report) to the base station. The wireless device may indicate, in a beam measurement report, one or more beam pair quality parameters. For example, a beam measurement report may comprise at least one of: one or more beam indicators/identifiers, RSRP(s), SINR(s), PMI(s), CQI(s), and/or RI(s) of at least one of the configured multiple beams/beam pair links. The base station and/or the wireless device may perform a downlink beam management procedure via one or more TRPs. A TRP may comprise a set of co-located antennas deployed at an antenna site location and used for transmission and reception.

The base station may send/transmit, to the wireless device, DCI indicating a beam pair link (e.g., comprising a serving beam) for the wireless device. The beam pair link may comprise a new beam pair link based on the beam measurement report from the wireless device. The base station may send/transmit a PDCCH transmission and/or PDSCH transmission to the wireless device via the serving beam. The wireless device and/or the base station may trigger beam failure recovery (and/or a beam failure procedure), for example, based on an occurrence of a beam failure for the beam pair link. The wireless device may send/transmit a beam failure recovery request (BFRQ) signal to the base station, for example, based on the occurrence of the beam failure. A beam failure may occur if a quality measurement, corresponding to at least one transmission (e.g., a PDCCH transmission), for the beam pair link(s) is less than a threshold. The threshold may be configured by the base station, for the wireless device, via an RRC message. The base station may send/transmit a transmission/message (e.g., a PDSCH transmission, a PDCCH transmission) via a beam pair link (e.g., a transmission (Tx) beam from the base station to a receiving (Rx) beam of the wireless device). The base station and/or the wireless device may trigger (and/or start) a beam failure recovery procedure, for example, if the transmission via the beam pair link (e.g., comprising the Tx beam of the base station and the Rx beam of the wireless device) has an RSRP and/or an SINR value (e.g., as measured by the wireless device) that is/are less than the corresponding thresholds. Reduced RSRP and/or SINR may result from the beam pair link being obscured/blocked (e.g., by a moving train or a building).

Figure 17:
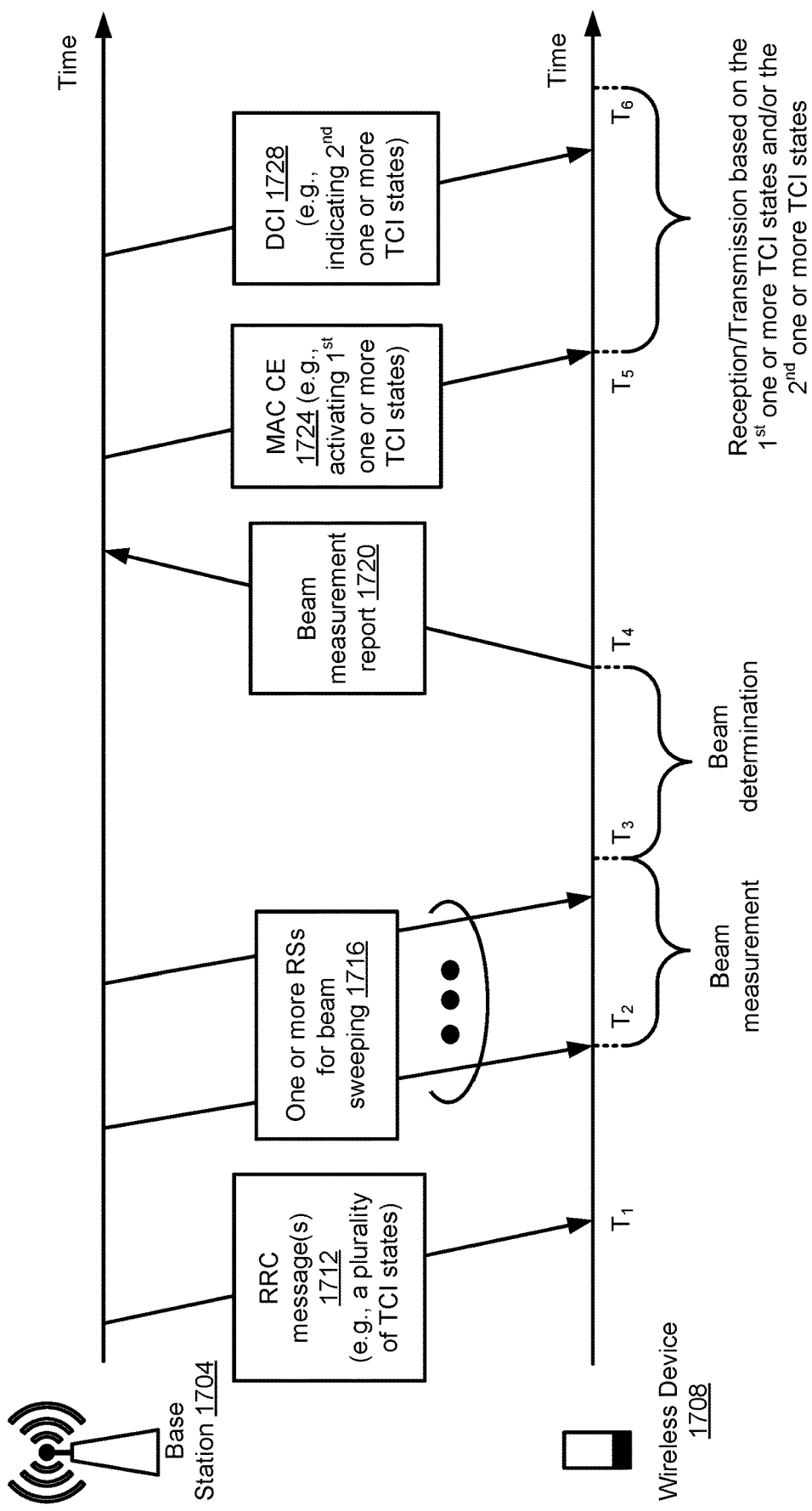
FIG. 17 shows an example for beam management.

FIG. 17 shows an example communication for beam management. The example beam management may comprise sending of a beam measurement report to a base station based on one or more measurements performed by a wireless device. The base station may send an indication of one or more transmission and/or reception beam(s) for the wireless device.

A wireless device 1708 may receive (e.g., at or after time T1), from a base station 1704, one more RRC messages 1712 comprising configuration parameters. The configuration parameters may indicate a plurality of TCI states. Each of the plurality of TCI states may be associated with/indicate at least one reference signal (RS). The at least one RS associated with a TCI state may be used by the wireless device for quasi-colocation information. The at least one RS may be indicated, by the configuration parameters, in the TCI state. The RS may comprise at least one of an SSB, a CSI-RS, a DMRS, and/or an SRS. The wireless device 1708 may receive, from the base station 1704, one or more RSs 1716 for beam sweeping (e.g., within a duration from time T2 to time T3). Each of the one or more RSs 1716 may be associated with one of the plurality TCI states. The wireless device 1708 may perform beam measurement based on the one or more RSs 1716 for beam sweeping (e.g., within the duration from time T2 to time T3). The beam measurement may comprise RSRP(s) measurement and/or SINR(s) measurement of the one or more RSs 1716. The wireless device 1708 may perform beam determination for one or more beams (e.g., among beams associated with the one or more RSs 1716) based on the beam measurement (e.g., within the duration from time T3 to time T4). The one or more beams may be beams with best radio link qualities (e.g., highest RSRP(s) and/or highest SINR(s)). The wireless device 1708 may send/transmit a beam measurement report 1720 to the base station 1704 (e.g., at or after time T4). The beam measurement report 1720 may comprise/indicate at least one of: one or more RS indicators/identifiers of one or more second RSs (e.g., corresponding to the beams with best radio link qualities) of the one or more RSs 1716, RSRP(s) of the one or more second RSs, SINR(s) of the one or more second RSs, PMI(s) of the one or more second RSs, CQI(s) of the one or more second RS(s), RI(s) of the one or more second RSs. Each of the one or more RSs may be associated with a corresponding downlink beam. The wireless device 1708 may receive, from the base station 1704, a MAC CE 1724 activating first one or more TCI states (e.g., at or after time T5). The base station 1704 may determine the first one or more TCI states based on the beam measurement report 1720. The first one or more TCI states may be associated with the one or more second RSs, for example, corresponding to the best radio link qualities. The wireless device 1708 may receive (e.g., within the duration from time T5 to time T6), from the base station 1704, DCI 1728 indicating second one or more TCI states. The first one or more TCI states may comprise the second one or more TCI states. The second one or more TCI states may be selected, by the base station 1704 and/or the wireless device 1708, from the first one or more TCI states. The wireless device 1708 may perform a reception based on the first one or more TCI states and/or based on the second one or more TCI states (e.g., within the duration from time T5 to time T6). The wireless device 1708 may perform a transmission based on the first one or more TCI states and/or based on the second one or more TCI states (e.g., within the duration from time T5 to time T6).

Figure 18A:
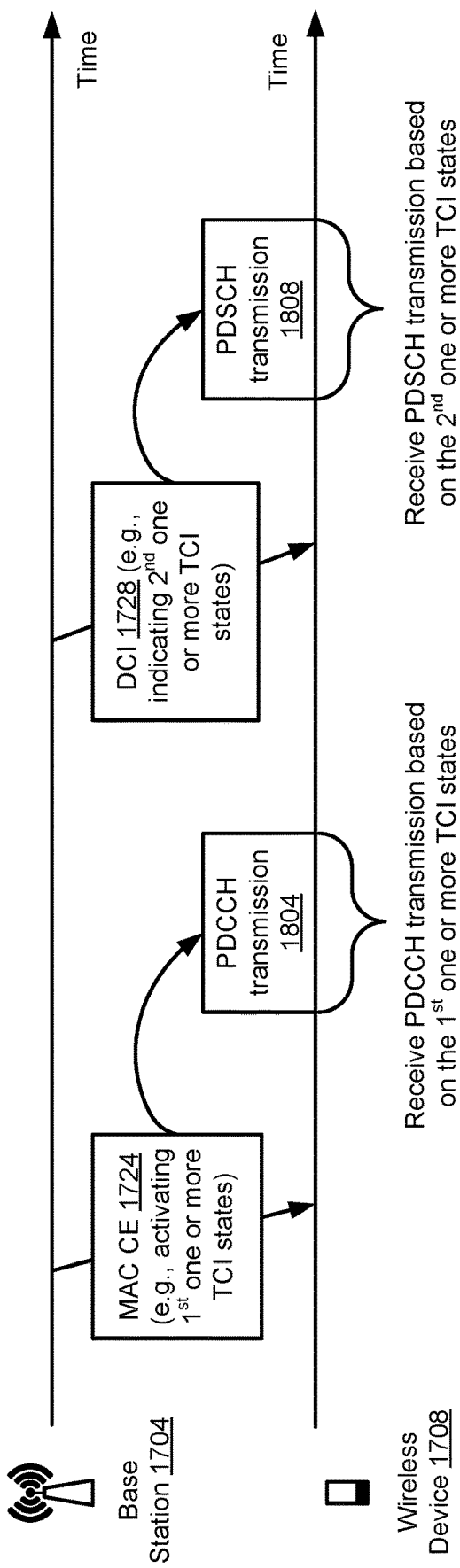
FIG. 18A shows an example communication between a wireless device and a base station based on transmission configuration indication (TCI) states.
Figure 18B:
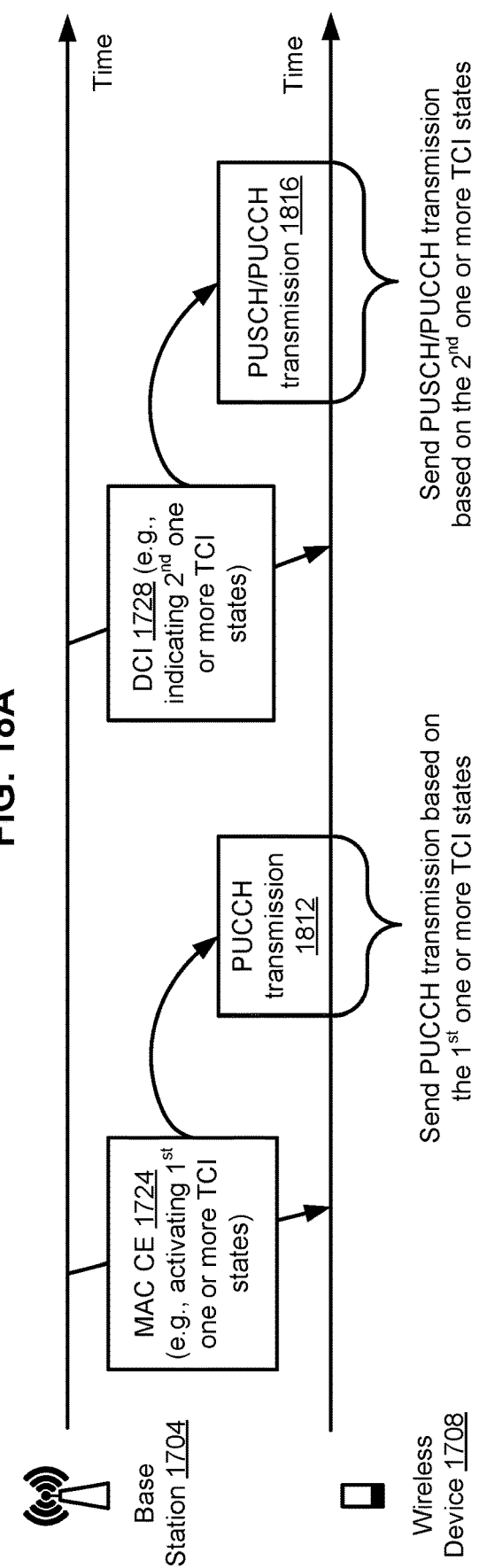
FIG. 18B shows an example communication between a wireless device and a base station based on transmission configuration indication (TCI) states.

FIGS. 18A and 18B shows example communication between a wireless device and a base station. The communication may be based on TCI states (e.g., activated by the base station). The TCI states may correspond to the first one or more TCI states and/or the second one or more TCI states as described with respect to FIG. 17.

The TCI states may be activated by the base station 1704. The wireless device 1708 may receive a downlink transmission (e.g., a PDCCH transmission and/or a PDSCH transmission) and/or send an uplink transmission (e.g., a PUCCH transmission and/or a PUSCH transmission) based on one or more TCI states. The wireless device 1708 may receive a PDCCH transmission 1804 based on the first one or more TCI states activated by the MAC CE 1724, for example, as shown in FIG. 18A. The wireless device 1708 may receive a PDSCH transmission 1808 based on the second one or more TCI states indicated by the DCI 1728. The wireless device 1708 may send a PUCCH transmission 1812 based on the first one or more TCI states activated by the MAC CE 1724, for example, as shown in FIG. 18B. The wireless device 1708 may send a PUSCH transmission 1816 based on the second one or more TCI states indicated by the DCI 1728. The wireless device 1708 may send a PUCCH transmission 1816 based on the second one or more TCI states indicated by the DCI 1728.

The wireless device 1708 may have a beam correspondence capability. The wireless device may determine an uplink transmission beam (and/or a spatial domain transmission filter used for transmission) based on a downlink reception beam (and/or a spatial domain transmission filter used for reception) based on the beam correspondence capability. The wireless device 1708 may determine a downlink reception beam (and/or spatial domain transmission filter used for reception) based on an uplink transmission beam (and/or spatial domain transmission filter used for transmission) based on the beam correspondence capability. The wireless device 1708 may receive one or more transmissions via downlink physical channels (e.g., PDCCH and/or PDSCH) based on a TCI state. The wireless device 1708 may receive one or more transmissions via the downlink physical channels (e.g., PDCCH and/or PDSCH) using a same spatial domain transmission filter (e.g., beam) as used for a reception of RS(s) (e.g., SSB, CSI-RS, DMRS, and/or any other reference signal) associated with the TCI state. The wireless device 1708 may receive, based on the beam correspondence capability, transmissions via the downlink physical channels (e.g., PDCCH and/or PDSCH) using a same spatial domain transmission filter (e.g., beam) as used for a transmission of RS(s) (e.g., SRS, or any other reference signal) associated with the TCI state. The wireless device 1708 may send transmissions via uplink physical channels (e.g., PUCCH and/or PUSCH) based on the TCI state. The wireless device 1708 may send, based on the beam correspondence capability, transmissions via the uplink physical channels (e.g., PUCCH and/or PUSCH) using a same spatial domain transmission filter as used for a reception of RS(s) (e.g., SSB, CSI-RS, DMRS, and/or any other reference signal) associated with the TCI state. The wireless device 1708 may send transmissions via the uplink physical channels (e.g., PUCCH and/or PUSCH) using a same spatial domain transmission filter as used for a transmission of RS(s) (e.g., SRS) associated with the TCI state.

A wireless device may determine one or more beams used for downlink reception(s) and/or uplink transmission(s). The wireless device may determine the one or more beams, for example, based on a downlink message (e.g., MAC CE activation and/or a DCI indication). The wireless device may receive, from a base station, a MAC CE activating a downlink beam for downlink PDCCH reception(s). The wireless device may receive, from the base station, a MAC CE activating an uplink beam for uplink PUCCH transmission(s). The wireless device may receive, from the base station, a MAC CE activating multiple downlink beams for downlink PDSCH reception(s). The wireless device may receive, from the base station, DCI indicating one or more downlink beams of the multiple downlink beams. The wireless device may perform downlink PDSCH reception(s) based on the one or more downlink beams. The wireless device may receive, from the base station, a MAC CE activating multiple uplink beams for uplink PUSCH transmission(s). The wireless device may receive, from the base station, DCI indicating one or more uplink beams of the multiple uplink beams. The wireless device may perform uplink PUSCH transmission(s) based on the one or more uplink beams. The wireless device may receive, from the base station, a MAC CE activating multiple uplink beams for uplink PUCCH transmission(s). The wireless device may receive, from the base station, DCI indicating one or more uplink beams of the multiple uplink beams. The wireless device may perform uplink PUCCH transmission(s) based on the one or more uplink beams.

Beam management procedures may be used in at least some wireless communications (e.g., based on 3GPP NR, earlier or later 3GPP generations and/or releases, and/o or any other wireless communication system) that utilize beamforming. A base station may send a message (e.g., a MAC CE), to a wireless device, activating one or more new transmission beams. The base station may send the message, for example, based on determining the one or more new transmission beams. The base station may determine the one or more new transmission beams based on a beam measurement report (e.g., from the wireless device). The message (e.g., the MAC CE) may be sent via a PDSCH to the wireless device. Using a MAC CE to activate transmission beams may increase communication latency. The one or more new transmission beams may be applied/used by the wireless device, for example, based on (e.g., after) a delay period following the reception of the MAC CE. For example, the delay period (e.g., 3 ms, or any other first time duration) may follow an acknowledgement, by the wireless device, of the PDSCH transmission containing the MAC CE. For example, the delay period (e.g., greater than 3 ms, or any other second time duration greater than the first time duration) may follow an acknowledgment of the PDSCH transmission based on a HARQ procedure being applied for the PDSCH transmission. The MAC CE may reduce spectrum efficiency of a PDSCH, for example, based on signaling overhead of the MAC CE transmission via the PDSCH. Various deployments may require aggressive reduction in latency and/or signaling overhead for beam management. The deployment may comprise, for example, wireless communications involving high speed vehicular traffic (e.g., high speed trains, highways, wireless devices traveling at high speed (e.g., more than 120 km/h, or higher speeds), high frequency communications (e.g., in channels located at frequencies exceeding 6 GHz, or other high frequencies), etc.). Downlink and/or uplink beam determination based on MAC CE activation may not be suitable for high speed applications, for example, based on latency and/or signaling overhead associated with MAC CE activation. An example approach to overcome latency and signaling overhead issues of the MAC CE for beam activation may comprise using wireless device-specific DCI instead of the MAC CE. The wireless device-specific DCI may be sent to the wireless device, for example, if each beam needs to be updated for the wireless device. Using wireless device specific-DCI may significantly increase physical layer signaling overhead and/or power consumption of the wireless device. For example, a corresponding wireless device-specific DCI may need to be sent for each wireless device.

Various examples herein describe enhanced control signaling between a base station and a wireless device to enable enhanced beam management. The enhanced control signaling may be based on a group common control channel transmission for indicating transmission beams (e.g., TCI states) for a plurality of wireless devices. A wireless device may determine uplink beam(s) and/or downlink beam(s) based on a first control channel transmission (e.g., a first PDCCH transmission) and/or a second control channel transmission (e.g., a second PDCCH transmission). The first PDCCH transmission may be a group common PDCCH transmission (e.g., group common DCI). The second PDCCH transmission may be wireless device-specific PDCCH transmission (e.g., wireless device-specific DCI). The wireless device may determine a bitfield of the first PDCCH transmission based on a position configured by a base station (e.g., via an RRC message, or any other configuration message). The bitfield may indicate one or more TCI states of a plurality of TCI states (e.g., as indicated by an RRC message). The wireless device may send/transmit uplink signals and/or receive downlink signals based on the one or more TCI states. The wireless device may send/transmit uplink signals and/or receive downlink signals based on one or more second TCI states indicated by the second PDCCH transmission. The wireless device may ignore the second PDCCH transmission, for example, based on (e.g., after or in response to) not receiving and/or not detecting the first PDCCH transmission (e.g., within a time duration).

Various examples herein may decrease the latency and signaling overhead for beam management for a wireless device. The performance and/or signaling efficiency for the beam management may be increased without additional detection complexity for the downlink control channel (e.g., PDCCH), without significantly increasing physical layer signaling overhead, and/or without increasing the detection complexity of the wireless device and/or the base station. The enhanced beam management procedures may be advantageous for wireless devices in relatively high speed motion, for services requiring relatively lower latencies, and/or for communication via relatively high frequency channels.

Enhanced beam management procedure as described herein may be based on transmission conditions/scenarios, a wireless device behavior, configuration parameters, uplink transmission signals, etc. Enhanced beam management procedures may be based on different wireless device behaviors for receiving downlink signal and/or sending/transmitting uplink signals Enhanced beam management procedure may be based on different wireless device behaviors for receiving a downlink transmission (e.g., PDCCH transmission and/or a PDSCH transmission) Enhanced beam management procedure may be based on different wireless device behaviors for sending an uplink transmission (e.g., a PUSCH transmission and/or PUCCH transmission).

An enhanced beam management procedure may be based on transmission of DCI (e.g., a first DCI and/or a second DCI). The first DCI may be group common DCI sent via group common PDCCH. Sending the first DCI via the group common PDCCH may decrease a physical layer signaling overhead and a beam management latency. The first DCI may indicate a group of TCI states. The second DCI may indicate one or more of the group of TCI states. An enhanced beam management procedure may be based on different wireless device behaviors and/or need not require receiving candidate beam indication(s). The enhanced beam management procedure may be based on different wireless device behaviors for receiving update indication(s) of an association between codepoint(s) of DCI and wireless device/cell indicators/identities. Various examples described herein may be used for one or more types of transmissions (e.g., PDCCH transmissions, PUCCH transmissions, PDSCH transmissions, and/or PUSCH transmissions, codebook-based uplink transmission, and/or non-codebook-based uplink transmissions) via one or more TRPs.

Figure 19:
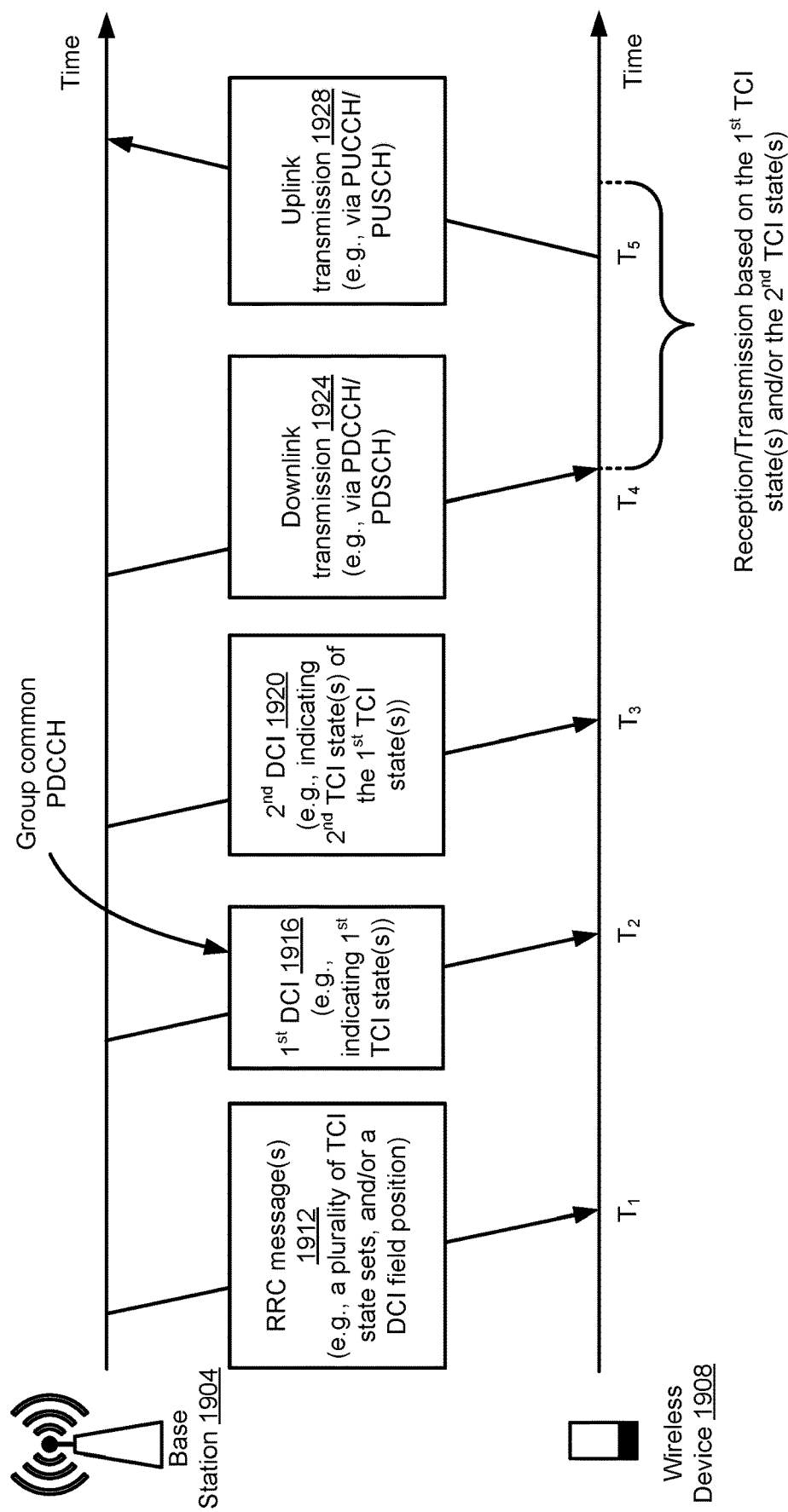
FIG. 19 shows an example of beam management for wireless communication.

FIG. 19 shows an example beam management for wireless communication. A base station 1904 may send, to a wireless device 1908, group common DCI to indicate TCI state(s) for the wireless device. The group common DCI may indicate TCI state(s) for one or more other wireless devices.

The wireless device 1908 may receive, from the base station 1904, one more messages 1912, such as RRC messages, (e.g., at or after time T1). The one or more messages 1912 may comprise configuration parameters. The configuration parameters may indicate a plurality of TCI state sets. The plurality of TCI state sets (e.g., each of the plurality of TCI state sets) may comprise one or more TCI states. The plurality of TCI state sets may comprise a plurality of TCI states with each of the plurality of TCI state sets comprising one TCI state. The one or more TCI states (e.g., each of the one or more TCI states) may be associated with at least one RS (e.g., used by the wireless device as quasi colocation information of TCI state). The RS may comprise at least one of an SSB, a CSI-RS, a DMRS, and an SRS. The configuration parameters may indicate/comprise (e.g., for the wireless device 1908) a DCI field position (e.g., field position, field position parameter, control information position parameter, etc.). The wireless device 1908 may receive (e.g., at or after time T2), from the base station 1904, first DCI 1916. The first DCI 1916 may indicate a first TCI state set of the plurality of TCI state sets. The first TCI state set may comprise first one or more TCI states. The DCI field position may indicate a starting position of a bit field within the first DCI 1916. The wireless device 1908 may determine, based on the first DCI 1916 and the DCI field position, the first TCI state set. The determination of the first TCI state set may comprise a first step and a second step. The first step may comprise determining, based on the DCI field position, a first field of the first DCI 1916. The DCI field position may be a starting position of the first field of the first DCI 1916. The second step may comprise determining the first TCI state set indicated by the first field of the first DCI 1916.

The first DCI 1916 may comprise group common DCI sent/transmitted by the base station 1904 via a group common PDCCH. The group common DCI may be scrambled based on a first RNTI. The group common DCI (e.g., transmitted by the base station via the group common PDCCH) may correspond to/target multiple wireless devices. The group common DCI may be successfully decoded by one or more of the multiple wireless devices based on the first RNTI (e.g., RNTI-Beam). The first RNTI may be different from a C-RNTI of the wireless device 1908. The wireless device 1908 may receive (e.g., at or after time T3), from the base station 1904, second DCI 1920. The second DCI 1920 may indicate second one or more TCI states of the first one or more TCI states (e.g., of the first TCI state set). The second DCI may be scrambled based on a second RNTI. The second RNTI may be the C-RNTI of the wireless device 1908. The wireless device 1908 may receive (e.g., at or after time T4), from the base station 1904, a downlink transmission 1924 (e.g., via a PDCCH and/or a PDSCH). The wireless device 1908 may send/transmit (e.g., at or after time T5), to the base station 1904, an uplink transmission 1928 (e.g., via a PUCCH and/or a PUSCH). The wireless device 1908 may receive, from the base station 1904, a downlink transmission (e.g., a PDCCH transmission) based on the first one or more TCI states. For example, the wireless device 1908 may determine that DMRS antenna port(s) associated with reception of the PDCCH transmission and RS(s) associated with the first one or more TCI states are quasi co-located.

The wireless device 1908 may receive the PDCCH transmission using same spatial domain transmission filter(s) (e.g., beam(s)) as used for reception(s) or transmission(s) of the RS(s) associated with the first one or more TCI states. The RS(s) associated with the first one or more TCI states may indicate quasi co-location information of the first one or more TCI states. The wireless device 1908 may receive, from the base station 1904, a PDSCH transmission based on the second one or more TCI states. For example, the wireless device 1908 may determine that DMRS antenna port(s) associated with reception of the PDSCH transmission and RS(s) associated with the second one or more TCI states are quasi co-located. The wireless device 1908 may receive the PDSCH transmission using the same spatial domain transmission filter(s) as used for reception(s) or transmission(s) of the RS(s) associated with the second one or more TCI states. The RS(s) associated with the second or more TCI states may indicate quasi co-location information of the second one or more TCI states. The wireless device 1908 may send, to the base station 1904, a PUCCH transmission based on the first one or more TCI states (or the second one or more TCI states). The wireless device 1908 may send the PUCCH transmission using the same spatial domain transmission filter(s) as used for reception(s) or transmission(s) of the RS(s) associated with the first one or more TCI states (or the second one or more TCI states). The wireless device 1908 may send, to the base station 1904, a PUSCH transmission based on the second one or more TCI states. The wireless device may send the PUSCH transmission using same spatial domain transmission filter(s) as used for reception(s) or transmission(s) of the RS(s) associated with the second one or more TCI states.

Figure 20:
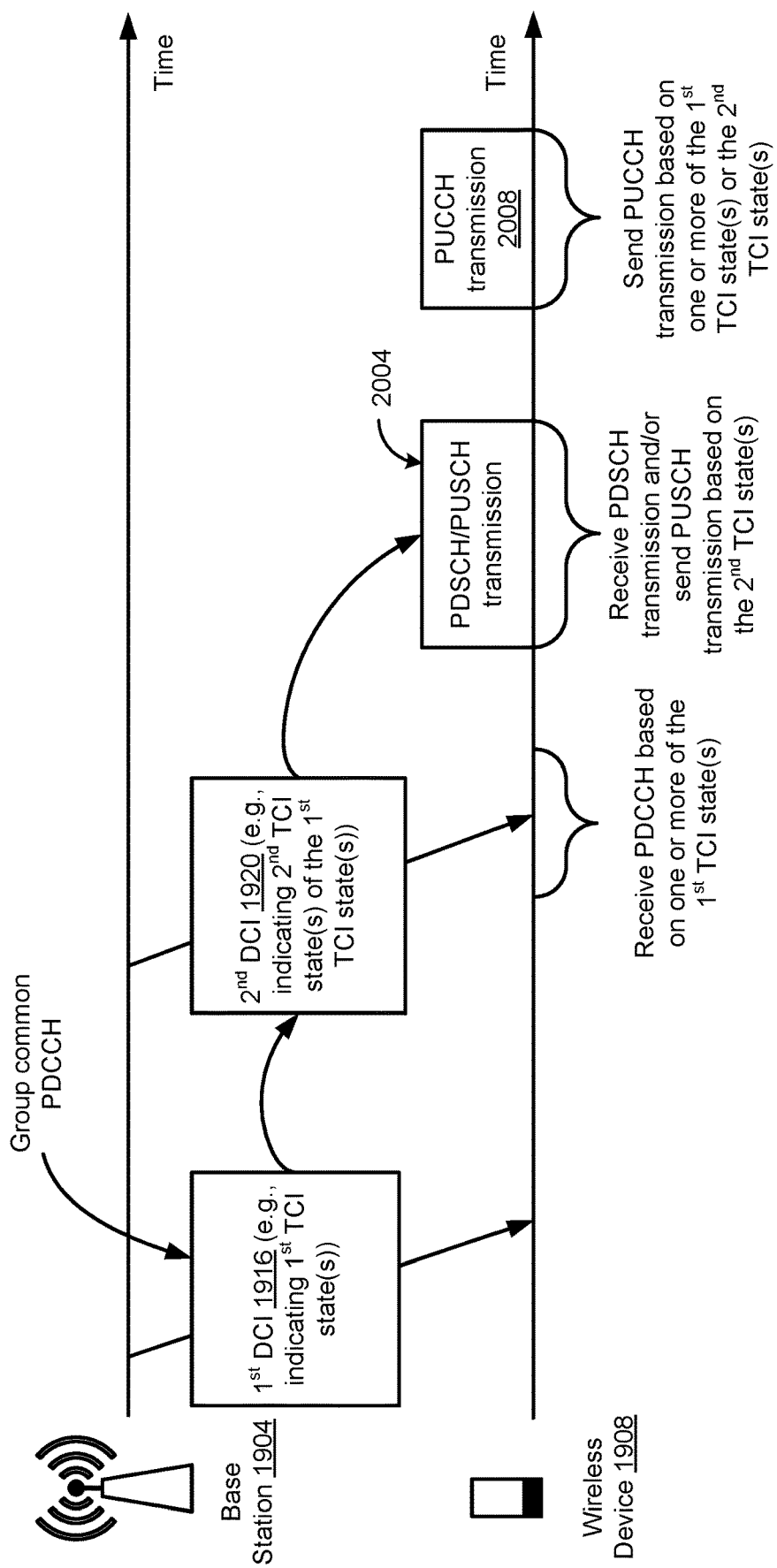
FIG. 20 shows an example wireless communication based on control signaling for beam management.

FIG. 20 shows example wireless communication based on control signaling for beam management. FIG. 20 shows uplink and/or downlink transmission based on received control signaling (e.g., the first DCI 1916, the second DCI 1920).

The wireless device 1908 may receive (e.g., at or after time T2 as shown in FIG. 19), from the base station 1904, the first DCI (1916. The first DCI 1916 may indicate the first TCI state set of the plurality of TCI state sets. The first TCI state set may comprise the first one or more TCI states. The wireless device 1908 may receive, from the base station 1904, the first DCI 1916 based on a TCI state activated by a MAC CE. The plurality of TCI state sets may comprise the TCI state activated by the MAC CE. The wireless device 1908 may receive (e.g., at or after time T3 as shown in FIG. 19), from the base station 1904, the second DCI 1920. The second DCI 1920 may indicate the second one or more TCI states of the first one or more TCI states. The wireless device 1908 may receive, from the base station 1904, the second DCI 1920 based on one or more TCI states of the first one or more TCI states. The wireless device 1908 may receive, from the base station 1904, the second DCI 1920 based on one of the first one or more TCI states. The one of the first one or more TCI states may correspond to a TCI state with a minimum/lowest TCI state indicator/index of the first one or more TCI states. The one of the first one or more TCI states may correspond to a TCI state with a maximum/highest TCI state indicator/index of the first one or more TCI states. The wireless device 1908 may receive, from the base station 1908 via multiple TRPs, the second DCI 1920. The second DCI 1920 via the multiple TRPs may be based on multiple TCI states of the first one or more TCI states. Each of the multiple TCI states may be associated with one of the multiple TRPs or may be associated with a CORESET pool indicator/index.

The wireless device 1908 may send/receive an uplink/a downlink transmission 2004 to/from the base station 1904. The wireless device 1908 may send/receive, to/from the base station 1904, an uplink/a downlink transmission 2004, for example, based on the first one or more TCI states or the second one or more TCI states. The wireless device 1908 may receive a downlink transmission 2004 from the base station 1904. The wireless device 1908 may receive, from the base station 1904, a downlink transmission 2004 (e.g., a PDSCH transmission) based on the second one or more TCI states indicated by the second DCI 1920. The wireless device 1908 may receive, from the base station 1904, a downlink transmission 2004 (e.g., a PDSCH transmission), for example, based on one of the second one or more TCI states indicated by the second DCI 1920. The one of the second one or more TCI states may correspond to a TCI state with a minimum/lowest TCI state indicator/index of the second one or more TCI states. The one of the second one or more TCI states may correspond to a TCI state with a maximum/highest TCI state indicator/index of the second one or more TCI states. The wireless device 1908 may receive, from the base station 1904 via multiple TRPs, a downlink transmission 2004 (e.g., a PDSCH transmission). The wireless device 1908 may receive the downlink transmission 2004 based on multiple TCI states of the second one or more TCI states indicated by the second DCI 1920.

The wireless device 1908 may send, to the base station 1904, an uplink transmission 2004 (e.g., a PUSCH transmission). The wireless device 1908 may send the uplink transmission based on the second one or more TCI states indicated by the second DCI 1920. The wireless device 1908 may send, to the base station 1904, an uplink transmission 2004 (e.g., a PUSCH transmission) based on one of the second one or more TCI states indicated by the second DCI 1920. The one of the second one or more TCI states may correspond to a TCI state with a minimum/lowest TCI state indicator/index of the second one or more TCI states. The one of the second one or more TCI states may correspond to a TCI state with a maximum/highest TCI state indicator/index of the second one or more TCI states. The wireless device 1908 may send, to the base station 1904 via multiple TRPs, an uplink transmission 2004 (e.g., a PUSCH transmission). The wireless device 1908 may send the uplink transmission 2004 via multiple TRPs, for example, based on multiple TCI states of the second one or more TCI states indicated by the second DCI 1920.

The wireless device 1908 may send, to the base station, a PUCCH transmission 2008. The wireless device 1908 may send the PUCCH transmission 2008, for example, based on the second one or more TCI states indicated by the second DCI 1920. The wireless device 1908 may send, to the base station 1904, a PUCCH transmission 2008, for example, based on one of the second one or more TCI states indicated by the second DCI 1920. The one of the second one or more TCI states may correspond to a TCI state with a minimum/lowest TCI state indicator/index of the second one or more TCI states. The one of the second one or more TCI states may correspond to a TCI state with a maximum/highest TCI state indicator/index of the second one or more TCI states. The wireless device 1908 may send, to the base station 1904 via multiple TRPs, a PUCCH transmission 2008. The wireless device 1908 may send the PUCCH transmission 2008, for example, based on multiple TCI states of the second one or more TCI states indicated by the second DCI 1920. The wireless device 1908 may send, to the base station 1904, a PUCCH transmission 2008, for example, based on the first one or more TCI states indicated by the first DCI 1916. The wireless device 1908 may send, to the base station 1904, a PUCCH transmission 2008, for example, based on one of the first one or more TCI states indicated by the first DCI 1916. The one of the first one or more TCI states may correspond to a TCI state with a minimum/lowest TCI state indicator/index of the first one or more TCI states. The one of the first one or more TCI states may correspond to a TCI state with a maximum/highest TCI state indicator/index of the first one or more TCI states. The wireless device 1908 may send, to the base station 1904 via multiple TRPs, a PUCCH transmission 2008, for example, based on multiple TCI states of the first one or more TCI states indicated by the first DCI 1916.

Figure 21:
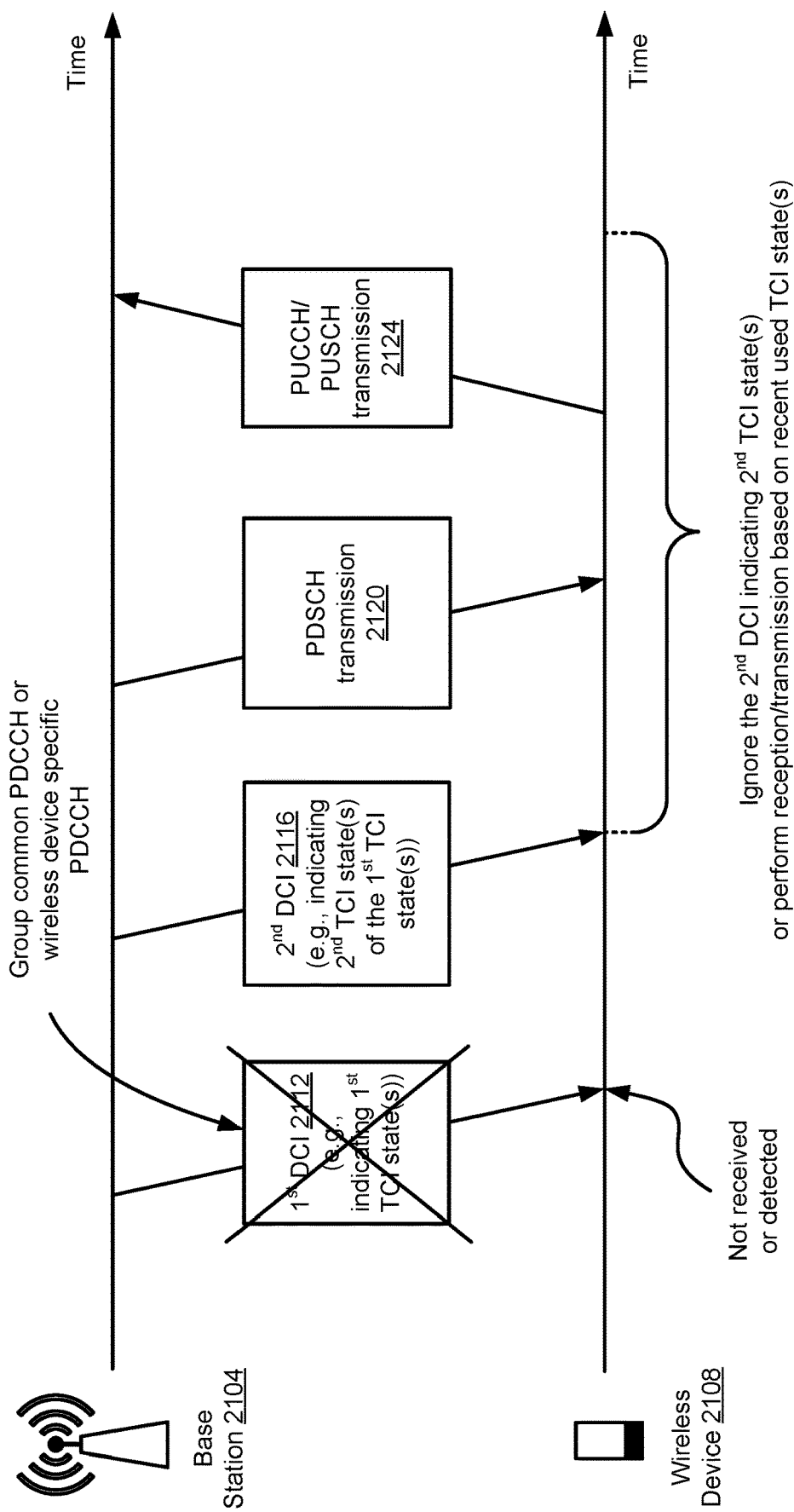
FIG. 21 shows an example beam management for wireless communication.

FIG. 21 shows example beam management for wireless communication. A wireless device 2108 may ignore information (e.g., may not process and/or respond to information) in a control signal (e.g., DCI) based on not receiving and/or detecting a previous control signal. The wireless device 2108 may use, for uplink/downlink transmissions, TCI state(s) indicated by most recently received prior control signaling and/or most recently used for previous uplink/downlink transmissions.

The wireless device 2108 may not receive (and/or may not detect), from a base station 2104, first DCI 2112 indicating first one or more TCI states. The wireless device 2108 may receive second DCI 2116 indicating the second one or more TCI states of the first one or more TCI states (or of the first TCI state set indicated by the first DCI 2112). The first DCI 2112 and the second DCI 2116 may be similar to the first DCI 1916 and second DCI 1920, respectively, as described with respect to FIGS. 19 and 20. The wireless device 2108 may ignore the second DCI 2116 indicating the second one or more TCI states, for example, based on (e.g., after or in response to) not receiving (and/or not detecting) the first DCI 2112. The first DCI 2112 may be group common DCI (and/or group common PDCCH transmission) or a wireless device-specific DCI (and/or wireless device-specific PDCCH transmission). The ignoring the second DCI 2116 may comprise dropping the second DCI 2116 based on (e.g., after or in response to) not receiving (and/or not detecting) the first DCI 2112. The wireless device 2108 may perform reception and/or transmission based on TCI state(s) recently used by the wireless device 2108 (e.g., used prior to a PDCCH containing the first DCI 2112). The wireless device 2108 may perform reception and/or transmission based on most recent TCI state(s) (e.g., most recently used TCI state(s)) as indicated by most recent first DCI and/or most recent second DCI (e.g., received prior to the PDCCH containing the first DCI 2112). The wireless device 2108 may perform reception and/or transmission based on most recent TCI state(s) (e.g., most recently indicated and/or used TCI state(s)) as indicated by the most recent first DCI (e.g., received prior to the PDCCH containing the first DCI 2112).

The wireless device 2108 may perform reception and/or transmission, for example, based on most recent TCI state(s) as indicated by the most recent second DCI (e.g., prior to the PDCCH containing the first DCI 2112). The wireless device 2108 may receive the second DCI 2116 via a PDCCH transmission, for example, based on most recently used TCI state(s) as indicated by the most recent first DCI (e.g., received prior to the PDCCH transmission comprising the first DCI 2112). The wireless device 2108 may receive a PDSCH transmission 2120 (e.g., a transport block), for example, based on the most recently used TCI state(s) as indicated by the most recent second DCI (e.g., received prior to the PDCCH containing the first DCI 2112).

The wireless device 2108 may send a PUSCH transmission 2124 (e.g., a transport block), for example, based on the most recently used TCI state(s) as indicated by the most recent second DCI (e.g., received prior to the PDCCH transmission comprising the first DCI 2112). The wireless device 2108 may send a PUCCH transmission 2124 (e.g., uplink control information), for example, based on the most recently used TCI state(s) as indicated by the most recent second DCI (e.g., received prior to the PDCCH transmission comprising the first DCI 2112). The wireless device 2108 may send a PUCCH transmission 2124 (e.g., uplink control information), for example, based on the most recent TCI state(s) as indicated by the most recent first DCI (e.g., received prior to the PDCCH transmission comprising the first DCI 2112).

FIG. 22A shows example format of DCI. First DCI (e.g., the first DCI 1916 as described with respect to FIGS. 19 and 20) may comprise a plurality of bitfields as shown in FIG. 22A. The first DCI may comprise bitfield 0, bitfield 1, bitfield 2, bitfield 3, bitfield 4, . . . , bitfield n, where n may be a positive integer. Each of the plurality of bitfields may comprise one or more bits. A wireless device may receive, from a base station, one or more messages (e.g., RRC messages) comprising configuration parameters. The configuration parameters may indicate a DCI field position for the wireless device within the first DCI. The DCI field position may be a starting position of bitfield 0, bitfield 1, bitfield 2, bitfield 3, bitfield 4, . . . , or bitfield n within the first DCI. Each of the plurality of bitfields may indicate a first TCI state set (e.g., as described with respect to FIGS. 19 and 20) for a corresponding wireless device (e.g., wireless device 0, wireless device 1, wireless device 2, wireless device 3, wireless device 4, . . . , or wireless device n). The wireless device may determine, based on the first DCI and the DCI field position, a first TCI state set, of the plurality of TCI state sets, corresponding to the wireless device. For example, the wireless device may determine that a bitfield (e.g., bitfield 0) corresponds to the wireless device based on the first DCI and the DCI field position.

The wireless device may determine that the first TCI state set indicated by the bitfield (e.g., bitfield 0) corresponds to the wireless device. Bitfield 0 may indicate the first TCI state set for the wireless device 0. Bitfield 1 may indicate the first TCI state set for wireless device 1. Bitfield 2 may indicate the first TCI state set for wireless device 2. Bitfield 3 may indicate the first TCI state set for wireless device 3. Bitfield 4 may indicate the first TCI state set for wireless device 4. Bitfield n may indicate the first TCI state set for wireless device n.

Multiple wireless devices may be associated with a single bitfield. For example, a bitfield may be associated with a first wireless device and one or more second wireless devices. RRC message(s) to the one or more second wireless devices may indicate a same DCI field position, for the one or more second wireless devices, within the first DCI.

The plurality of bitfields (e.g., each of the plurality of bitfields) may indicate the first TCI state set for one or more wireless devices (e.g., bitfield 0 may indicate the first TCI state set for wireless device 0, wireless device 10, wireless device 18, and/or wireless device 30). The plurality of bitfields (e.g., each of the plurality of bitfields) may indicate the first TCI state set for a group of wireless devices (e.g., the group may comprise wireless device 0, wireless device 10, wireless device 18, and/or wireless device 30). The group of wireless devices may be determined by the base station based on the beam reporting, wireless device location information, and/or mobility status and information.

FIG. 22B shows an example format of DCI. First DCI (e.g., the first DCI 1916 as described with respect to FIGS. 19 and 20) may comprise a plurality of bitfields as shown in FIG. 22B. The first DCI may comprise bitfield 0, bitfield 1, bitfield 2, bitfield 3, bitfield 4, . . . , bitfield n, where n may be a positive integer. Each of the plurality of bitfields may comprise one or more bits. A wireless device may receive, from a base station, one more RRC messages comprising configuration parameters. The wireless device may determine TCI states for reception and/or transmission via multiple cells (e.g., using carrier aggregation). The configuration parameters may indicate a DCI field position for a cell within the first DCI. The DCI field position may be a starting position of bitfield 0, bitfield 1, bitfield 2, bitfield 3, bitfield 4, . . . , or bitfield n within the first DCI. The plurality of bitfields (e.g, each of the plurality of bitfields) may indicate the first TCI state set (e.g., as described with respect to FIGS. 19 and 20) for the cell (e.g., for wireless device(s) associated with the cell). The wireless device may determine, for the cell based on the first DCI and the DCI field position, the first TCI state set of the plurality of TCI state sets. The wireless device may determine a bitfield (e.g., bitfield 0) based on the first DCI and the DCI field position for the cell (e.g., cell 0). The wireless device may determine the first TCI state set, indicated by the bitfield, for the cell. Bitfield 0 may indicate the first TCI state set for cell 0. Bitfield 1 may indicate the first TCI state set for cell 1. Bitfield 2 may indicate the first TCI state set for cell 2. Bitfield 3 may indicate the first TCI state set for cell 3. Bitfield 4 may indicate the first TCI state set for cell 4. Bitfield n may indicate the first TCI state set for cell n. The DCI field position may indicate a starting position of the bitfield for the cell.

Figure 23A:
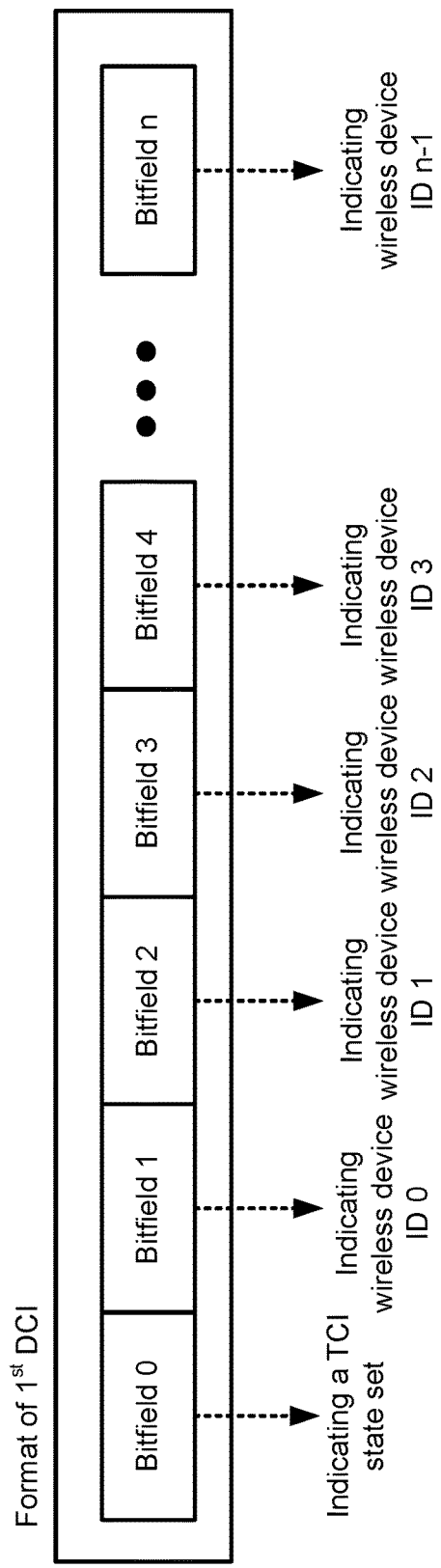
FIG. 23A shows an example format of DCI.

FIG. 23A shows an example format of DCI. First DCI (e.g., the first DCI 1916 as described in FIGS. 19 and 20) may comprise a plurality of bitfields as shown in FIG. 23A. The first DCI may comprise bitfield 0, bitfield 1, bitfield 2, bitfield 3, bitfield 4, . . . , bitfield n, where n may be a positive integer. The plurality of bitfields (e.g., each of the plurality of bitfields) may comprise one or more bits. A wireless device may receive, from a base station, one more RRC messages comprising configuration parameters. The configuration parameters may indicate a DCI field position for the wireless device within the first DCI. The DCI field position may be a starting position of a bitfield (e.g., bitfield 0) indicating the first TCI state set within the first DCI (e.g., as described with respect to FIGS. 19 and 20). A bitfield (e.g., one of the plurality of bitfields, such as bitfield 0) may indicate the first TCI state set. The wireless device may determine, based on the first DCI and the DCI field position, the first TCI state set of the plurality of TCI state sets. The wireless device may determine the bitfield (e.g., bitfield 0) based on the first DCI and the DCI field position. The wireless device may determine the first TCI state set indicated by the bitfield (e.g., bitfield 0). The other bitfields (e.g., each of other bitfields) (e.g., except bitfield 0) of the first DCI (e.g., bitfield 1, bitfield 2, bitfield 3, bitfield 4, . . . , and bitfield n.) may indicate a wireless device indicator/identity (ID) (e.g., a C-RNTI). The first TCI state set indicated by the bitfield (e.g., bitfield 0) may correspond to wireless devices with wireless device IDs indicated by each of the other bitfields (e.g., except bitfield 0). Bitfield 1 may indicate wireless device ID 0 (e.g., C-RNTI 0). Bitfield 2 may indicate wireless device ID 1 (e.g., C-RNTI 1). Bitfield 3 may indicate wireless device ID 2 (e.g., C-RNTI 2). Bitfield 4 may indicate wireless device ID 3 (e.g., C-RNTI 3). Bitfield n may indicate wireless device ID n–1 (e.g., C-RNTI n–1). The wireless device may determine that a wireless device ID (e.g., C-RNTI) of the wireless device is indicated by the first DCI (e.g., by a bitfield of the first DCI). The wireless device may apply the first TCI state set indicated by the first DCI (e.g., by bitfield 0 of the first DCI), for example, based on (e.g., in response to) the first DCI indicating the wireless device ID of the wireless device. While the first DCI of FIG. 23A shows a single bitfield with the first TCI state set and corresponding wireless devices for which the first TCI state set may be applied, in other examples, the first DCI may comprise one or more other bitfields with other first TCI state set(s) and corresponding wireless devices for which the other first TCI state set(s) may be applied.

Figure 23B:
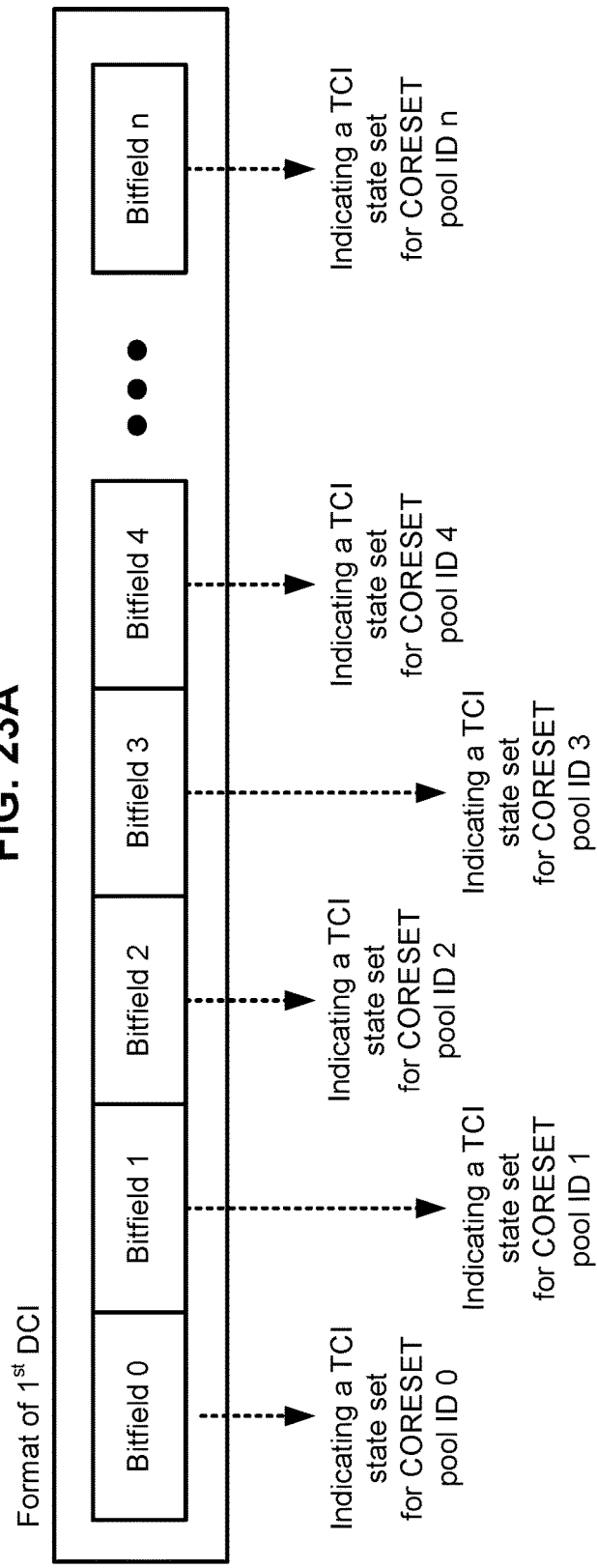
FIG. 23B shows an example format of DCI.

FIG. 23B shows an example format of DCI. First DCI may comprise a plurality of bitfields. The first DCI (e.g., as described with respect to FIGS. 19 and 20) may comprise bitfield 0, bitfield 1, bitfield 2, bitfield 3, bitfield 4, . . . , bitfield n, where n may be a positive integer. The plurality of bitfields (e.g., each of the plurality of bitfields) may comprise one or more bits. A wireless device may receive, from a base station, one more messages (e.g., RRC messages) comprising configuration parameters. The wireless device may determine TCI states for multiple TRPs (e.g., in scenario where the wireless device may communicate via multiple TRPs). Each of the multiple TRPs may be associated with a CORESET pool indicator/index/identity (ID). The configuration parameters may indicate a DCI field position for a CORESET pool ID (e.g., for a CORESET corresponding to the CORESET pool ID) within the first DCI. The DCI field position may be a starting position of bitfield 0, bitfield 1, bitfield 2, bitfield 3, bitfield 4, . . . , or bitfield n within the first DCI. The plurality of bitfields (e.g., each of the plurality of bitfields) may indicate a first TCI state set (e.g., as described with respect to FIGS. 19 and 20) for a CORESET pool ID. The wireless device may determine, based on the first DCI and the DCI field position, the first TCI state set of the plurality of TCI state sets for the CORESET pool ID (e.g., for a CORESET pool corresponding to the CORESET pool ID). The wireless device may determine, based on the first DCI and the DCI field position, a bitfield for the CORESET pool ID (e.g., CORESET pool ID 0). The wireless device may determine the first TCI state set, indicated by the bitfield, for the CORESET pool ID (e.g., CORESET pool ID 0). Bitfield 0 may indicate the first TCI state set for CORESET pool ID 0. Bitfield 1 may indicate the first TCI state set for CORESET pool ID 1. Bitfield 2 may indicate the first TCI state set for CORESET pool ID 2. Bitfield 3 may indicate the first TCI state set for CORESET pool ID 3. Bitfield 4 may indicate the first TCI state set for CORESET pool ID 4. Bitfield n may indicate the first TCI state set for CORESET pool ID n.

Figure 24:
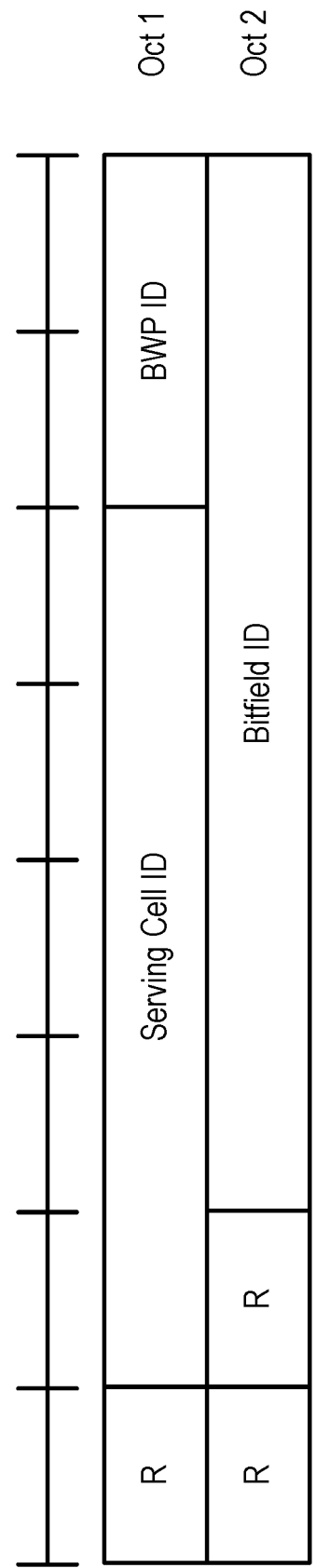
FIG. 24 shows an example format of a media access control control element (MAC CE).

FIG. 24 shows an example format of a MAC CE. The configuration parameters may indicate the DCI field position for the wireless device within the first DCI (e.g., as described with respect to FIG. 22A). The wireless device may receive, from the base station, a MAC CE updating (and/or modifying) the DCI field position for the wireless device within the first DCI. The configuration parameters may indicate the DCI field position for a cell within the first DCI (e.g., as described with respect to FIG. 22B). The wireless device may receive, from the base station, the MAC CE updating (and/or modifying) the DCI field position for the cell within the first DCI. The configuration parameters may indicate the DCI field position for a CORESET pool ID within the first DCI (e.g., as described with respect to FIG. 23B). The wireless device may receive, from the base station, the MAC CE updating (and/or modifying) the DCI field position for the CORESET pool ID within the first DCI. The MAC CE may comprise at least one of: a serving cell indicator/ID, a BWP indicator/ID, and bitfield indicator/ID). The serving cell ID may indicate the serving cell for which the MAC CE may apply. The length of a field for the serving cell ID may be five bits (or any other quantity of bits). The BWP ID may indicate an uplink BWP for which the MAC CE may apply as the codepoint of DCI BWP indicator field. The length of a field for the BWP ID may be two bits (or any other quantity of bits). Bitfield ID field may indicate a bitfield ID (or a DCI field position), within the first DCI, used for indicating the first TCI state set for the wireless device, the cell, and/or the CORESET pool ID. The wireless deivce may determine, based on the MAC CE, the bitfield ID (or the DCI field position) used for indicating the first TCI state set for the wireless deivce. The wireless device may determine, based on the MAC CE, the bitfield ID (or DCI field position) used for indicating the first TCI state set for the cell. The cell may correspond to a cell with the serving cell ID. The wireless device may determine, based on the MAC CE, the bitfield ID (and/or DCI field position) used for indicating the first TCI state set for the CORESET pool ID.

Figure 25:
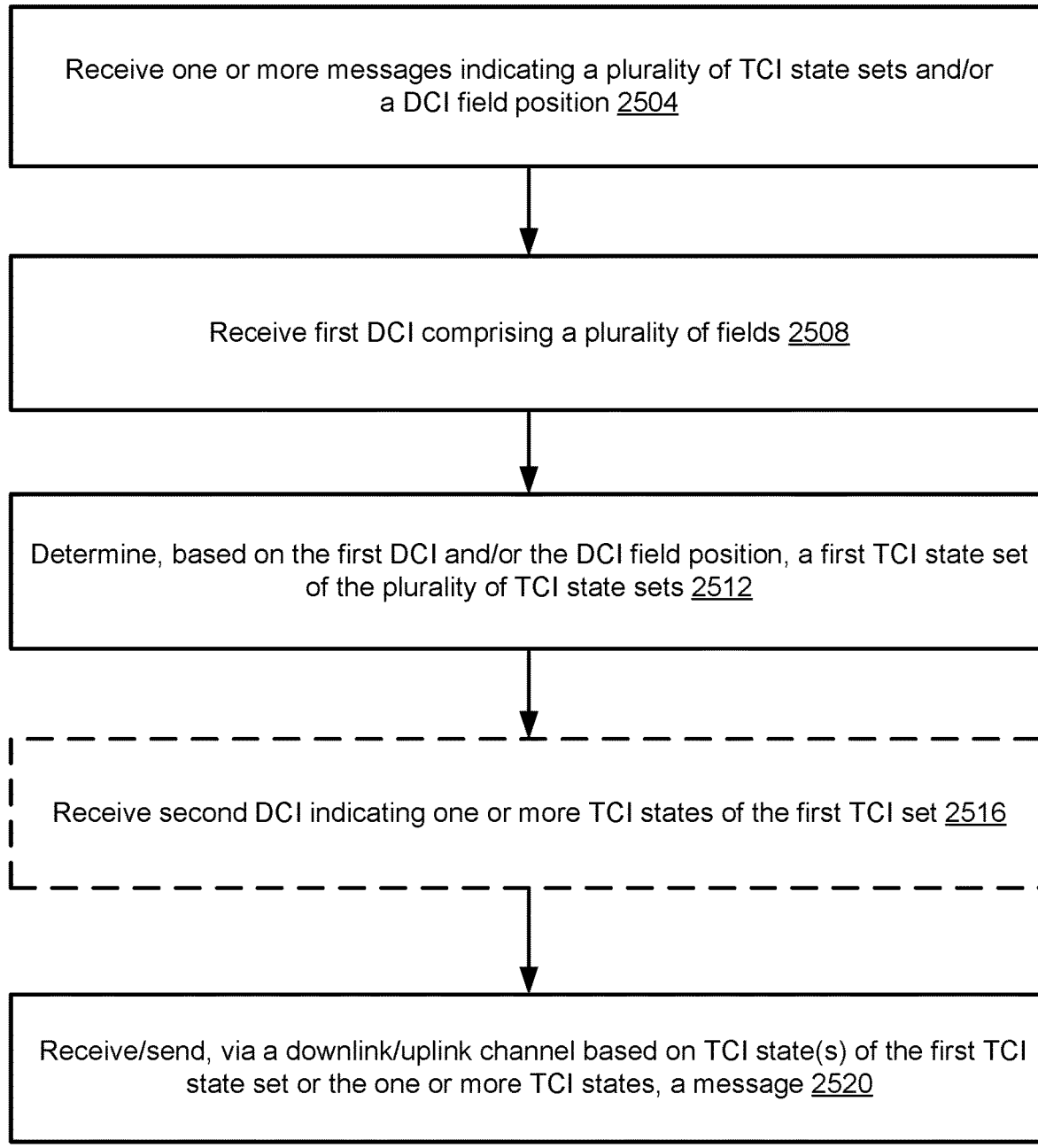
FIG. 25 shows an example method for beam management.

FIG. 25 shows an example method for beam management. At step 2504, wireless device may receive, from a base station, one or more configuration messages (e.g., one or more RRC messages) comprising configuration parameters. The configuration parameters may indicate a plurality of TCI state sets. The configuration parameters may indicate a DCI field position. At step 2508, the wireless device may receive first DCI comprising a plurality of fields. At step 2512, the wireless device may determine, based on the first DCI and/or the DCI field position, a first TCI state set of the plurality of TCI state sets. At step 2516, the wireless device may receive second DCI indicating one or more TCI states of the first TCI state set. The reception of the second DCI may be optional. At step 2520, the wireless device may send/receive an uplink transmission or downlink transmission (e.g., comprising a transport block, control information, etc), via an uplink or a downlink channel, based on TCI state(s) of the first TCI state set indicated by the first DCI and/or the one or more TCI states indicated by the second DCI. An uplink channel may comprise a PUSCH and/or a PUCCH. A downlink channel may comprise a PDSCH and/or a PDCCH.

A wireless device may receive, from a base station, one or more messages comprising configuration parameters. The configuration parameters may indicate a plurality of TCI state sets. The configuration parameters may indicate a DCI field position. The wireless device may receive, from the base station, first DCI comprising a plurality of fields. The wireless device may determine, based on the first DCI and the DCI field position, a first TCI state set of the plurality of TCI state sets. The wireless device may receive, from the base station, second DCI indicating one or more TCI states of the first TCI state set. The wireless device may receive, from the base station via a PDSCH and based on the one or more TCI states, a transport block.

The first DCI may be group common DCI transmitted via a group common PDCCH. The first DCI may be scrambled based on a first RNTI. The second DCI may be scrambled based on a second RNTI. The second RNTI may comprise a second value different from a first value of the first RNTI. The wireless device may transmit the transport block, via a PUSCH, based on the one or more TCI states. The wireless device may transmit uplink control information, via a PUCCH, based on the one or more TCI states. The wireless device may receive the second DCI based on second one or more TCI states of the first TCI state set. The wireless device may determine the second one or more TCI states with lowest TCI state indicator(s)/index(es) or highest TCI state indicator(s)/index(es) of the first TCI state set. The wireless device may transmit uplink control information via a PUCCH based on third one or more TCI states of the first TCI state set.

The wireless device may determine the third one or mor TCI states with lowest TCI state indicator(s)/index(es) or highest TCI state indicator(s)/index(es) of the first TCI state set. Each of the plurality of TCI state sets may comprise one or more TCI states. The plurality of TCI state sets may comprise a plurality of TCI states with each of the plurality of TCI state sets comprising one TCI state. Each TCI state of the plurality of TCI state sets may be associated with a reference signal used for quasi co-location information. The reference signal may comprise an SSB. The reference signal may comprise a CSI-RS. The reference signal may comprise a DMRS. The reference signal may comprise an SRS. The first DCI may comprise one or more fields. Each field of the first DCI may comprise one or more bits. The wireless device may determine, based on the first DCI and the DCI field position, the first TCI state set. The determining the first TCI state set may comprise a first step and a second step. The first step may comprise determining a first field of the first DCI based on the DCI field position. The second step may comprise determining the first TCI state set indicated by the first field of the first DCI. The wireless device may receive the transport block, from the base station via multiple TRPs and the PDSCH, based on multiple TCI states of the one or more TCI states. The wireless device may receive the transport block, from the base station via a TRP and the PDSCH, based on a TCI state of the one or more TCI states.

A wireless device may receive, from a base station, one or more messages comprising configuration parameters. The configuration parameters may indicate a plurality of TCI state sets. The configuration parameters may indicate a DCI field position. The wireless device may receive, from the base station, first DCI comprising a plurality of fields. The wireless device may determine, based on the first DCI and the DCI field position, a first TCI state set of the plurality of TCI state sets. The wireless device may receive, from the base station, second DCI indicating one or more TCI states of the first TCI state set. The wireless device may transmit, to the base station via a PDSCH, a transport block based on the one or more TCI states.

A wireless device may receive, from a base station, one or more messages comprising configuration parameters. The configuration parameters may indicate a plurality of TCI state sets. The configuration parameters may indicate a DCI field position for a cell. The wireless device may receive, from the base station, first DCI comprising a plurality of fields. The wireless device may determine, for the cell based on the first DCI and the DCI field position, a first TCI state set of the plurality of TCI state sets. The wireless device may receive, from the base station, second DCI indicating one or more TCI states of the first TCI state set. The wireless device may receive, from the base station based on the one or more TCI states, a transport block via a PDSCH of the cell.

A wireless device may receive, from a base station, one or more messages comprising configuration parameters. The configuration parameters may indicate a plurality of TCI state sets. The configuration parameters may indicate a DCI field position. The wireless device may receive, from the base station, first DCI comprising a plurality of fields. At least one of the plurality of fields may comprise an indicator/identify of the wireless device. The wireless device may determine a first TCI state set of the plurality of TCI state sets based on the first DCI and the DCI field position. The wireless device may receive, from the base station, second DCI indicating one or more TCI states of the first TCI state set. The wireless device may receive, from the base station via a PDSCH, a transport block based on the one or more TCI states.

A wireless device may receive, from a base station, one or more messages comprising configuration parameters. The configuration parameters may indicate a plurality of TCI state sets. The configuration parameters may indicate a DCI field position for a CORESET pool indicator/identity. The wireless device may receive, from the base station, first DCI comprising a plurality of fields. The wireless device may determine, for the CORESET pool identity based on the first DCI and the DCI field position, a first TCI state set of the plurality of TCI state sets. The wireless device may receive, from the base station, second DCI indicating one or more TCI states of the first TCI state set. The wireless device may receive, from the base station via a PDSCH associated with the CORESET pool identity, a transport block based on the one or more TCI states.

A wireless device may receive, from a base station, one or more messages comprising configuration parameters. The configuration parameters may indicate a plurality of TCI state sets. The configuration parameters may indicate a DCI field position within first DCI. The wireless device may receive, from the base station, second DCI indicating first one or more TCI states of a first TCI state set of the plurality of TCI state sets. The wireless device may ignore the second DCI, for example, based on not receiving the first DCI comprising the DCI field indicating the first TCI state set. The wireless device may receive, from the base station via a PDSCH, a transport block, based on recently used second one or more TCI states.

A wireless device may receive, from a base station, one or more messages comprising configuration parameters. The configuration parameters may indicate a plurality of TCI state sets. The wireless device may receive, from the base station, first DCI indicating a first TCI state set of the plurality of TCI state sets. The wireless device may receive, from the base station, second DCI indicating one or more TCI states of the first TCI state set. The wireless device may receive, from the base station via a PDSCH, a transport block based on the one or more TCI states.

A wireless device may perform a method comprising multiple operations. The wireless device may receive one or more configuration parameters indicating: a plurality of transmission configuration indication (TCI) states; and a position parameter for the wireless device. The position parameter may comprise a control information position parameter (e.g., a DCI field position). The wireless device may receive downlink control information (DCI) comprising a field, associated with the position parameter, that indicates one or more TCI states, of the plurality of TCI states, for the wireless device. The wireless device may communicate based on a spatial domain filter corresponding to a TCI state of the one or more TCI states. The wireless device may also perform one or more additional operations. The wireless device may receive, based on the TCI state, second DCI indicating a second TCI state of the one or more TCI states. The wireless device may communicate based on a second spatial domain filter corresponding to the second TCI state. The position parameter may indicate a starting position of the field. The second DCI may be scrambled based on a radio network temporary identifier (RNTI). The RNTI may be different from a second RNTI associated with the DCI. The DCI may comprise group common DCI. The receiving the DCI may comprise receiving the DCI via a group common physical downlink control channel (PDCCH). The DCI may be scrambled based on a group common radio network temporary identifier (RNTI) associated with the DCI. The communicating may comprise at least one of: receiving a transport block via a physical downlink shared channel (PDSCH); receiving second DCI via a physical downlink control channel (PDCCH); transmitting a transport block via a physical uplink shared channel (PUSCH); transmitting uplink control information (UCI) via a physical uplink control channel (PUCCH); or transmitting a sounding reference signal via an uplink channel. The TCI state may be associated with at least one of a lowest TCI state indicator or a highest TCI state indicator among one or more TCI state indicators of the one or more TCI states. The one or more configuration parameters may indicate a plurality of TCI state sets comprising the plurality of TCI states. Each TCI state set of the plurality of TCI state sets may comprise one TCI state. Each TCI state of the plurality of TCI states may be associated with one or more reference signals. The one or more reference signals may comprise at least one of: a synchronization signal block (SSB); a channel state information reference signal (CSI-RS); a demodulation reference signal (DMRS); or a sounding reference signal (SRS). The DCI may comprise a plurality of fields comprising the field. Each field of the plurality of fields of the DCI indicates one or more TCI states, of the plurality of TCI states, for a respective wireless device. The wireless device may determine, based on a position of the field of the plurality of fields and for the wireless device, the one or more TCI states. Each TCI state of the plurality of TCI states may be associated with a reference signal used for quasi colocation information or spatial relation information. Each field of the plurality of fields of the DCI may comprise one or more bits. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the one or more configuration parameters. A computer-readable medium may store instructions that, when executed, cause performance of the described method, additional operations and/or include the additional elements.

A wireless device may perform a method comprising multiple operations. The wireless device may receive one or more configuration parameters indicating: a plurality of transmission configuration indication (TCI) states; and a position parameter for the wireless device. The position parameter may comprise a control information position parameter (e.g., a DCI field position). The wireless device may receive downlink control information (DCI) comprising a field, associated with the position parameter, that indicates one or more TCI states, of the plurality of TCI states, for the wireless device. The wireless device may receive second DCI indicating a TCI state of the one or more TCI states. The wireless device may communicate based on a spatial domain filter corresponding to the TCI state indicated in the second DCI. The wireless device may also perform one or more additional operations. The wireless device may communicate based on a second spatial domain filter corresponding to a second TCI state, of the one or more TCI states, different from the TCI state. The communicating may comprise at least one of: receiving a transport block via a physical downlink shared channel (PDSCH); transmitting a transport block via a physical uplink shared channel (PUSCH); transmitting uplink control information (UCI) via a physical uplink control channel (PUCCH); or transmitting a sounding reference signal via an uplink channel. The DCI may comprise group common DCI. The receiving the DCI may comprise receiving the DCI via a group common physical downlink control channel (PDCCH). The receiving the second DCI may comprise receiving the second DCI based on one of the one or more TCI states. Each TCI state of the plurality of TCI states may be associated with one or more reference signals. The one or more reference signals may comprise at least one of: a synchronization signal block (SSB); a channel state information reference signal (CSI-RS); a demodulation reference signal (DMRS); or a sounding reference signal (SRS). The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the one or more configuration parameters. A computer-readable medium may store instructions that, when executed, cause performance of the described method, additional operations and/or include the additional elements.

A wireless device may perform a method comprising multiple operations. The wireless device may receive one or more configuration parameters indicating: a plurality of transmission configuration indication (TCI) states; and a position parameter for a cell. The position parameter may comprise a control information position parameter (e.g., a DCI field position). The wireless device may receive downlink control information (DCI) comprising a field, associated with the position parameter, that indicates one or more TCI states, of the plurality of TCI states, for the cell. The wireless device may communicate, via the cell, based on a spatial domain filter corresponding to a TCI state of the one or more TCI states. The wireless device may also perform one or more additional operations. The cell may comprise a serving cell for the wireless device. The wireless device may receive, based on the TCI state, second DCI indicating a second TCI state of the one or more TCI states. The wireless device may communicate based on a second spatial domain filter corresponding to the second TCI state. The DCI may comprise group common DCI. The receiving the DCI may comprise receiving the DCI via a group common physical downlink control channel (PDCCH). The TCI state may be associated with at least one of a lowest TCI state indicator or a highest TCI state indicator among one or more TCI state indicators of the one or more TCI states. Each TCI state of the plurality of TCI states may be associated with one or more reference signals. The one or more reference signals may comprise at least one of: a synchronization signal block (SSB); a channel state information reference signal (CSI-RS); a demodulation reference signal (DMRS); or a sounding reference signal (SRS). The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the one or more configuration parameters. A computer-readable medium may store instructions that, when executed, cause performance of the described method, additional operations and/or include the additional elements.

A wireless device may perform a method comprising multiple operations. The wireless device may receive configuration parameters indicating: a plurality of transmission configuration indication (TCI) states; and a position parameter for the wireless device. The position parameter may comprise a control information position parameter (e.g., a DCI field position). The wireless device may receive downlink control information (DCI) comprising a plurality of fields. The position parameter may indicate a position of a field, of the plurality of fields, for the wireless device. The field may indicate one or more TCI states, of the plurality of TCI states, for the wireless device. The wireless device may receive a second DCI indicating a second TCI state of the one or more TCI states. The wireless device may transmit one or more uplink signals based on a spatial domain filter corresponding to the second TCI state. The wireless device may also perform one or more additional operations. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the configuration parameters. A computer-readable medium may store instructions that, when executed, cause performance of the described method, additional operations and/or include the additional elements.

A wireless device may perform a method comprising multiple operations. The wireless device may receive configuration parameters indicating: a plurality of transmission configuration indication (TCI) states; and a position parameter for a cell of a plurality of cells. The position parameter may comprise a control information position parameter (e.g., a DCI field position). The wireless device may receive downlink control information (DCI) comprising a plurality of fields. The position parameter may indicate a position of a field, of the plurality of fields, for the cell. The field may indicate a TCI state, of the plurality of TCI states, for the cell. The wireless device may transmit, based on a spatial domain filter corresponding to the TCI state, one or more uplink signals of the cell. The wireless device may also perform one or more additional operations. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the configuration parameters. A computer-readable medium may store instructions that, when executed, cause performance of the described method, additional operations and/or include the additional elements.

A wireless device may perform a method comprising multiple operations. The wireless device may receive configuration parameters indicating: a plurality of transmission configuration indication (TCI) states; and a position parameter for the wireless device. The position parameter may comprise a control information position parameter (e.g., a DCI field position). The wireless device may receive downlink control information (DCI) comprising a plurality of fields. The position parameter may indicate a position of a field, of the plurality of fields, for the wireless device. The field may indicate a TCI state, of the plurality of TCI states, for the wireless device. At least one field, of the plurality of fields, may indicate an identifier of the wireless device. The wireless device may transmit one or more uplink signals based on a spatial domain filter corresponding to the TCI state. The wireless device may also perform one or more additional operations. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the configuration parameters. A computer-readable medium may store instructions that, when executed, cause performance of the described method, additional operations and/or include the additional elements.

A wireless device may perform a method comprising multiple operations. The wireless device may receive configuration parameters indicating: a plurality of transmission configuration indication (TCI) states; and a position parameter for a control resource set (CORESET) pool index of a plurality of CORESET pool indexes. The wireless device may receive downlink control information (DCI) comprising a plurality of fields. The position parameter may indicate a position of a field, of the plurality of fields, for the CORESET pool index. The field may indicate a TCI state, of the plurality of TCI states, associated with the CORESET pool index. The wireless device may transmit one or more uplink signals based on a spatial domain filter corresponding to the TCI state. The wireless device may also perform one or more additional operations. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the configuration parameters. A computer-readable medium may store instructions that, when executed, cause performance of the described method, additional operations and/or include the additional elements.

A wireless device may perform a method comprising multiple operations. The wireless device may receive configuration parameters indicating a plurality of transmission configuration indication (TCI) state sets. Each of the plurality TCI state sets may comprise one or more TCI states. The wireless device may receive first downlink control information (DCI) indicating a first TCI state set of the plurality of TCI state sets. The wireless device may receive second DCI indicating one or more TCI states of the first TCI state set. The wireless device may transmit one or more uplink signals based on one or more spatial domain filters corresponding to the one or more TCI states. The wireless device may also perform one or more additional operations. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the configuration parameters. A computer-readable medium may store instructions that, when executed, cause performance of the described method, additional operations and/or include the additional elements.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, or other 3GPP or non-3GPP technology.

One or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:
1. A method comprising:
 receiving, by a wireless device, one or more configuration parameters indicating:
  a plurality of transmission configuration indication (TCI) states; and
  a control information position parameter for the wireless device;
 receiving, by the wireless device, downlink control information (DCI) comprising a field, associated with the control information position parameter, that indicates one or more TCI states, of the plurality of TCI states, for the wireless device; and communicating, by the wireless device, based on a spatial domain filter corresponding to a TCI state of the one or more TCI states.

2. The method of claim 1, further comprising:
receiving, based on the TCI state, second DCI indicating a second TCI state of the one or more TCI states; and
communicating based on a second spatial domain filter corresponding to the second TCI state.

3. The method of claim 1, wherein the DCI comprises group common DCI and wherein the receiving the DCI comprises receiving the DCI via a group common physical downlink control channel (PDCCH).

4. The method of claim 1, wherein the communicating comprises at least one of:
receiving a transport block via a physical downlink shared channel (PDSCH);
receiving second DCI via a physical downlink control channel (PDCCH);
transmitting a transport block via a physical uplink shared channel (PUSCH);
transmitting uplink control information (UCI) via a physical uplink control channel (PUCCH); or
transmitting a sounding reference signal via an uplink channel.

5. The method of claim 1, wherein the TCI state is associated with at least one of a lowest TCI state indicator or a highest TCI state indicator among one or more TCI state indicators of the one or more TCI states.

6. The method of claim 1, wherein the control information position parameter indicates a starting position of the field.

7. The method of claim 1, wherein each TCI state of the plurality of TCI states is associated with one or more reference signals, wherein the one or more reference signals comprise at least one of:
a synchronization signal block (SSB);
a channel state information reference signal (CSI-RS);
a demodulation reference signal (DMRS); or
a sounding reference signal (SRS).

8. The method of claim 1, wherein the DCI comprises a plurality of fields comprising the field, and wherein each field of the plurality of fields of the DCI indicates one or more TCI states, of the plurality of TCI states, for a respective wireless device.

9. A method comprising:
receiving, by a wireless device, one or more configuration parameters indicating:
a plurality of transmission configuration indication (TCI) states; and
a control information position parameter for the wireless device;
receiving, by the wireless device, downlink control information (DCI) comprising a field, associated with the control information position parameter, that indicates one or more TCI states, of the plurality of TCI states, for the wireless device;
receiving, by the wireless device, second DCI indicating a TCI state of the one or more TCI states; and
communicating, by the wireless device, based on a spatial domain filter corresponding to the TCI state indicated in the second DCI.

10. The method of claim 9, further comprising communicating based on a second spatial domain filter corresponding to a second TCI state, of the one or more TCI states, different from the TCI state.

11. The method of claim 9, wherein the communicating comprises at least one of:
receiving a transport block via a physical downlink shared channel (PDSCH);
transmitting a transport block via a physical uplink shared channel (PUSCH);
transmitting uplink control information (UCI) via a physical uplink control channel (PUCCH); or
transmitting a sounding reference signal via an uplink channel.

12. The method of claim 9, wherein the DCI comprises group common DCI and wherein the receiving the DCI comprises receiving the DCI via a group common physical downlink control channel (PDCCH).

13. The method of claim 9, wherein the receiving the second DCI comprises receiving the second DCI based on one of the one or more TCI states.

14. The method of claim 9, wherein each TCI state of the plurality of TCI states is associated with one or more reference signals, wherein the one or more reference signals comprise at least one of:
a synchronization signal block (SSB);
a channel state information reference signal (CSI-RS);
a demodulation reference signal (DMRS); or
a sounding reference signal (SRS).

15. A method comprising:
receiving, by a wireless device, one or more configuration parameters indicating:
a plurality of transmission configuration indication (TCI) states; and
a control information position parameter for a cell;
receiving, by the wireless device, downlink control information (DCI) comprising a field, associated with the control information position parameter, that indicates one or more TCI states, of the plurality of TCI states, for the cell; and
communicating, by the wireless device via the cell, based on a spatial domain filter corresponding to a TCI state of the one or more TCI states.

16. The method of claim 15, wherein the cell comprises a serving cell for the wireless device.

17. The method of claim 15, further comprising:
receiving, based on the TCI state, second DCI indicating a second TCI state of the one or more TCI states; and
communicating based on a second spatial domain filter corresponding to the second TCI state.

18. The method of claim 15, wherein the DCI comprises group common DCI and wherein the receiving the DCI comprises receiving the DCI via a group common physical downlink control channel (PDCCH).

19. The method of claim 15, wherein the TCI state is associated with at least one of a lowest TCI state indicator or a highest TCI state indicator among one or more TCI state indicators of the one or more TCI states.

20. The method of claim 15, wherein each TCI state of the plurality of TCI states is associated with one or more reference signals, wherein the one or more reference signals comprise at least one of:
a synchronization signal block (SSB);
a channel state information reference signal (CSI-RS);
a demodulation reference signal (DMRS); or
a sounding reference signal (SRS).

* * * * *

UNITED STATES PATENT AND TRADEMARK OFFICE
CERTIFICATE OF CORRECTION

Page 1 of 4

PATENT NO. : 11,871,415 B2
APPLICATION NO. : 17/364446
DATED : January 9, 2024
INVENTOR(S) : Xu et al.

It is certified that error appears in the above-identified patent and that said Letters Patent is hereby corrected as shown below:

On the Title Page

Item (56) In the References

Column 2, Other Publications, Line 1:
Delete ""Disscussion" and insert --"Discussion--

In the Specification

Column 10, Line 27:
Delete "(TB s)" and insert --(TBs)--

Column 11, Line 33:
Delete "laters may:" and insert --layers may:--

Column 12, Line 1:
Delete "223" and insert --212--

Column 13, Line 29:
After "commands", insert --.--

Column 33, Lines 8-9:
Delete "prach-ConfigIndex)." and insert --prach-ConfigIndex).--

Column 33, Line 50:
Delete "rsrp-ThresholdCSl-RS)." and insert --rsrp-ThresholdCSI-RS).--

Column 35, Line 9:
Delete "Typel-PDCCH" and insert --Type1-PDCCH--

Signed and Sealed this
Eleventh Day of March, 2025

Coke Morgan Stewart
*Acting Director of the United States Patent and Trademark Office*

Column 35, Line 31:
Delete "0≤fid<8)," and insert --0≤f_id<8),--

Column 36, Line 59:
Delete "ra-PreambleIndex)." and insert --ra-PreambleIndex).--

Column 36, Line 67:
Delete "recoverySearchSpaceId)." and insert --recoverySearchSpaceId).--

Column 43, Line 35:
Delete "sending/transmision" and insert --sending/transmission--

Column 47, Line 4:
After "running", insert --.--

Column 48, Line 42:
Delete "T1)," and insert --$T_1$),--

Column 48, Line 42:
Delete "one more" and insert --one or more--

Column 48, Line 54:
Delete "T2" and insert --$T_2$--

Column 48, Line 54:
Delete "T3)." and insert --$T_3$).--

Column 48, Line 58:
Delete "T2" and insert --$T_2$--

Column 48, Line 58:
Delete "T3)." and insert --$T_3$).--

Column 48, Line 64:
Delete "T3" and insert --$T_3$--

Column 48, Line 64:
Delete "T4)." and insert --$T_4$).--

Column 49, Line 1:
Delete "T4)." and insert --$T_4$).--

Column 49, Line 13:
Delete "T5)." and insert --$T_5$).--

Column 49, Line 18:
Delete "T5" and insert --$T_5$--

Column 49, Line 19:
Delete "T6)," and insert --$T_6$),--

Column 49, Line 27:
Delete "T5" and insert --$T_5$--

Column 49, Line 27:
Delete "T6)." and insert --$T_6$).--

Column 49, Line 30:
Delete "T5" and insert --$T_5$--

Column 49, Line 30:
Delete "T6)." and insert --$T_6$).--

Column 52, Line 17:
After "signals", insert --.--

Column 52, Line 20:
After "transmission)", insert --.--

Column 52, Line 51:
Delete "one more" and insert --one or more--

Column 52, Line 52:
Delete "T1)." and insert --$T_1$).--

Column 53, Line 1:
Delete "T2)," and insert --$T_2$),--

Column 53, Line 26:
Delete "T3)," and insert --$T_3$),--

Column 53, Line 32:
Delete "T4)," and insert --$T_4$),--

Column 53, Line 35:
Delete "T5)," and insert --$T_5$),--

Column 54, Line 15:
Delete "T2" and insert --$T_2$--

CERTIFICATE OF CORRECTION (continued)
U.S. Pat. No. 11,871,415 B2

Column 54, Line 23:
Delete "T3" and insert --$T_3$--

Column 57, Line 51:
Delete "one more" and insert --one or more--

Column 58, Line 17:
Delete "one more" and insert --one or more--

Column 58, Line 65:
Delete "one more" and insert --one or more--

Column 59, Line 59:
Delete "deivce" and insert --device--

Column 59, Line 61:
Delete "deivce." and insert --device.--

Column 60, Line 53:
Delete "mor" and insert --more--

Column 62, Line 67:
Delete "signalsmay" and insert --signals may--

Column 67, Line 42:
Delete "Lab VIEWMathScript." and insert --LabVIEWMathScript.--

Column 68, Lines 46-47:
After "manner", insert --.--